United States Patent
Ankireddipally et al.

(10) Patent No.: US 6,772,216 B1
(45) Date of Patent: *Aug. 3, 2004

(54) INTERACTION PROTOCOL FOR MANAGING CROSS COMPANY PROCESSES AMONG NETWORK-DISTRIBUTED APPLICATIONS

(75) Inventors: Lakshmi Narasimha Ankireddipally, Sunnyvale, CA (US); Ryh-Wei Yeh, Palo Alto, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/574,334

(22) Filed: May 19, 2000

(51) Int. Cl.$^7$ .................. G06F 15/173; G06F 15/16; G06F 9/46; G06F 9/00
(52) U.S. Cl. .................. 709/230; 709/227; 709/219; 709/203; 719/330; 719/328
(58) Field of Search .................. 709/230, 217, 709/219, 315, 330

(56) References Cited

U.S. PATENT DOCUMENTS

| | | | |
|---|---|---|---|
| 5,893,108 A | 4/1999 | Srinivasan et al. | |
| 5,950,212 A | 9/1999 | Anderson et al. | |
| 5,956,483 A | 9/1999 | Grate et al. | 395/200.33 |
| 5,970,472 A | 10/1999 | Allsop et al. | 705/26 |
| 5,987,429 A | 11/1999 | Maritzen et al. | 705/31 |
| 5,999,979 A | 12/1999 | Vellanki et al. | 709/232 |
| 6,009,464 A | 12/1999 | Hamilton et al. | 709/219 |
| 6,321,234 B1 | 11/2001 | Debrunner | |
| 6,457,066 B1 * | 9/2002 | Mein et al. | 709/230 |
| 6,507,856 B1 | 1/2003 | Chen et al. | |
| 6,529,921 B1 | 3/2003 | Berkowitz et al. | |

OTHER PUBLICATIONS

Burns et al. ("Opentag and TMX: XML in the Localization Industry" Proceedings of the 16th annual international conference on Computer documentation; Quebec; pp. 137–142; Sep. 1998.*

"RosettaNet Implementation Framework Specification," Version 1.1 published Nov. 8, 1999, available at http://www.rosettanet.org as of Feb. 2000.

(List continued on next page.)

*Primary Examiner*—David Wiley
*Assistant Examiner*—Joseph E Avellino
(74) *Attorney, Agent, or Firm*—Hickman Palermo Truong & Becker LLP; Bobby K. Truong; Craig G. Holmes

(57) ABSTRACT

A general purpose application interaction protocol, referred to herein as the Commerce Exchange Interaction Protocol (CXIP), governs the exchange of data between applications resident in computers in a distributed network such as the Internet, providing for application interoperability. CXIP enables process communications among network-distributed software applications, particularly, but not exclusively, among software applications having dissimilar platforms, language dependencies or vendor dependencies. Data structures, object and method invocation requests are exchanged between applications by means of XML documents based on CXIP semantics. The application interaction protocol, which is not specific to any particular functional domain and specifies interactions that are independent of transactional content, includes four component parts: message formats, message types, exchange semantics and transportation assumptions. CXIP-based interactions use TCP/IP as their underlying transport mechanism, although CXIP may be implemented using SMTP or FTP, or on top of any other standard application-layer protocol, including HTTP.

24 Claims, 11 Drawing Sheets

OTHER PUBLICATIONS

Tim Bray, Jean Paoli, and C.M. Sperberg–McQueen, editors, *Extensible Markup Language (XML) 1.0: W3C Recommendation*, World Wide Web Consortium (W3C), Feb. 10, 1998.

David Burdett et al., *Internet Open Trading Protocol—IOTP Version 1.0*, work in progress of the Internet Engineering Task Force (IETP), Oct. 1999, available at IETF web site, http://www.ietf.org, as of Feb., 2000.

Mark S. Merkow, "New technology yields exceptional extranets", Oct. 11, 1999, available from http://www.intra-etjournal.com in Jan. 2000.

*Open Buying on the Internet Technical Specifications*, Release V2.0, published by the OBI Consortium; available at the OBI web site, http://openbuy.org, in Feb. 2000.

"Open Buying on the Internet: A Standard for Business-to-Business Internet Commerce", White Paper published by the OBI Consortium; available at the OBI web site, http://www.openbuy.org, in Feb. 2000.

"Microsoft eCommerce & Open Buying on the Internet", Powerpoint presentation published by the OBI Consortium; available at the OBI web site, http://www.openbuy.org, in Feb. 2000.

"XML Architecture", available from MSDN online Web Workshop web site at http://msdn.microsoft.com/xml/general/architecture.asp, downloaded Jan. 29, 2000.

"Netscape Announces Future XML Support in E–Commerce Applications", available at Web Developer News section of InternetNews.com, http://www.internetnews.com/wd-news, Mar. 10, 1999.

"Netscape ECXpert White Paper", available at iPlanet e–commerce solutions web site, http://www.iplanet.com/products/ecommerce/ecxpert, downloaded Feb. 16, 2000.

"Microsoft working on Net–based OS", San Jose Mercury News, Business section, San Jose CA, Mar. 23, 2000.

Jon Bosak and Tim Bray, "XML and the Second–Generation Web", *Scientific American*, May 1999, available at http://www.sciam.com/1999.

"Sun–Netscape Alliance Announces iPlanet Commerce Integration Suite for Building Online Trading Communities that Leverage Existing Systems Cross–Company", Netscape press release, Aug. 30, 1999, Mountain View CA, available at http://www.netscape.com/newsref/pr.

Box, Kakivaya et al., Soap: *Simple Object Acess Protocol*, work in progress of the Internet Engineering Task Force (IETP), Sep. 1999, Sep. 1999, available at http://www.ics.uci.edu/pub/ieff, as of Mar., 2000.

"Collaborative Efforts by Industry Leaders Make Business–to–Business Internet Commerce Secure and Interoperable", published by the OBI Consortium; available at the OBI web site, http://www.openbuy.org, downloaded Apr. 26, 2001.

* cited by examiner

INTERACTION PROTOCOL FOR MANAGING CROSS COMPANY PROCESSES AMONG NETWORK-DISTRIBUTED APPLICATIONS

CROSS-REFERENCES TO OTHER APPLICATIONS

The subject matter disclosed in this application is related to subject matter disclosed in concurrently filed, commonly-assigned U.S. Non-Provisional patent application Ser. No. 09/574,335, filed May 19, 2000 and entitled "Transaction Data Structure For Process Communications Among Network-Distributed Applications," and to U.S. Provisional patent application Ser. No. 60/205,433, filed May 19, 2000 and entitled "Shared Transaction Processing in a Clustered Process Automation Environment". These disclosures are incorporated by reference herein for all that each teaches as if set out in full.

FIELD OF THE INVENTION

The present invention relates generally to data communication between software applications in a distributed computer network such as the Internet. In particular, this invention provides an interaction protocol for enabling process communications among network-distributed software applications, particularly, but not exclusively, among applications having dissimilar platforms, language dependencies or vendor dependencies.

BACKGROUND OF THE INVENTION

Business entities have long recognized that substantial productivity and marketing benefits may potentially arise from conducting commercial business activities and business processes over distributed computer networks. In order for a business to achieve the full benefits of network-based commercial activity, the firm's existing commerce-related or business process software application systems must communicate both among each other and with the application systems of other business entities. However, it is often the case that software applications within an organization or among different business entities cannot easily exchange data because they may be built on disparate operating systems or use a variety of internally developed and third-party software that employ diverse programming languages. The inability to exchange data between application programs is sometimes referred to in the relevant literature as the lack of application interoperability. Earlier efforts at business-to-business commerce activity were led by Electronic Data Interchange (EDI) applications. EDI-based commercial activities worked well for certain applications such as order processing and payment exchange, but failed to make significant progress in other types of applications. File and information transfers in an EDI-based network were often performed using multiple communications protocols, requiring expensive application programming development or changes to existing systems in order to achieve a collaborative environment. Because of a lack of any universal data interchange formats, companies were, and still are, often prevented from exploiting their own enterprise systems integration or legacy systems to reach external partner applications.

In recent years, the Internet distributed computer network has developed the infrastructure and data communications protocols to connect all businesses to each other regardless of their size, geographic location or position in the supply chain. Networked distributed computer systems may be configured as intranets, extranets or publicly available systems using Internet technologies. Internet technologies provide business entities with another opportunity to achieve substantial productivity gains and marketing benefits by conducting internal, business-to-consumer and business-to-business Internet-based commercial activities among employees, and with customers, vendors, suppliers and other parties related to their business enterprises. Internet-based commercial activities, referred to generally as "electronic commerce", "e-commerce", or "e-business" include, but are not limited to, all types of business processes that can take place in a secure manner online, as well as the more traditional buying and selling of goods and services. The Internet environment holds out the promise of true collaborative data exchange and software application interoperability for business firms of all sizes. However, the promise is not yet fully a reality. The deployment of disparate computer systems, operating systems, and collections of operational data in an Internet environment for the purpose of collaborative processing and data exchange presents complex challenges to the successful implementation of e-commerce activities.

The primary Internet technological environment for commercial activities is the World Wide Web (the "Web") which predominantly uses Hypertext Transport Protocol (HTTP) as the standard application-layer interaction protocol and Hypertext Markup Language (HTML) as the standard document authoring language. (Note that a glossary of terms related to the Internet and relevant to this description is provided in the Appendix at the end of this disclosure.) Software tools and techniques currently available for designing and implementing Web-based commercial applications, such as HTML, CGI scripts, Java applets, JavaScript and browser plug-ins, provide Web authors and commercial sites with an array of techniques for displaying data content in a visually compelling and informative manner. However, these tools and techniques alone do not yet have the capabilities necessary to support sophisticated commercial transaction processing in a Web-based environment and do not fully address the application interoperability problem. For example, HTTP, the predominant application interaction protocol, is not extensible and cannot easily support the dynamic integration of application services without additional software interface development.

Standardization efforts toward addressing the problems of Internet- and Web-based application interoperability include industry consortia and vendor-specific e-commerce solutions. A recent new data representation standard, Extensible Markup Language (XML), was adopted by the World Wide Web Consortium in February, 1998. In its broadest sense, XML is a system for defining, validating, and sharing document formats on the Web, providing a universal format for structured documents and data. XML is a markup language for presenting documents on the Web that uses tags to identify data components, in a manner similar to HTML. However, XML is potentially more versatile than HTML because of its extensibility in defining specific subject matter domains of markup tags. Document Type Definitions (DTDs), referred to as dictionaries, vocabularies, or schemas, serve as a uniform source of data definitions for specific industries or fields of knowledge, making it easier to exchange data not only within an organization but also among different companies. Unlike HTML, XML is an extensible standard because users may define their own electronic document type in the form of a DTD. The simple language syntax makes it easy to process by machine while remaining understandable to people. XML style sheets, called XSLs, describe how the tagged data in an XML program should be displayed. Further information about XML and the World Wide Web Consortium, also known as W3C, can be found at the W3C Web site, http://www.w3c.org.

XML is in use in several industries, and forms the basis of several standardization efforts. In the financial industry, for example, J.P. Morgan & Co. Inc. and Price Waterhouse Coopers recently proposed an XML dictionary called FpML (Financial products Markup Language), which would standardize XML tags in areas such as fixed income derivatives and foreign currency exchange. The Internet Open Trading Protocol, Open Buying on the Internet, and RosettaNet have published non-proprietary XML-based standards for use in conducting various types of e-commerce over the Internet. And private vendors are also implementing XML based e-commerce solutions. Some of these standards as they relate to XML-based protocols are briefly discussed here.

The Internet Open Trading Protocol (IOTP) provides an interoperable framework for Internet commerce that is both payment system independent and optimized for the case where the buyer and the merchant do not have a prior acquaintance. It supports several standard Internet payment systems (e.g., CyberCash, DigiCash, etc.). IOTP is intended to handle cases where such merchant roles as the shopping site, the payment handler, the deliverer of goods or services, and the provider of customer support are performed by one party (i.e., Internet site) or by different parties. IOTP describes the content, format and sequences of messages that pass among the participants, referred to as Trading Roles, in an electronic trade. IOTP defines five different types of Trading Roles (Consumer, Merchant, Payment Handler, Delivery Handler, and Merchant Customer Care Provider) that are the ways in which organizations can participate in a trade. The IOTP framework is centered on an IOTP Transaction that involves one or more organizations playing a Trading Role, and a set of Trading Exchanges. Each Trading Exchange involves the exchange of data, between Trading Roles, in the form of a set of IOTP Messages. Each IOTP Message is the outermost wrapper for an XML document that is sent between Trading Roles that take part in a trade. An IOTP message is a well-formed XML document that contains several components including a collection of IOTP Trading Blocks (Request, Exchange, Response) that carries the data required to carry out an IOTP Transaction. An IOTP Trading Exchange consists of the exchange, between two Trading Roles, of a sequence of documents consisting of three main parts: the sending of a Request Block by one Trading Role (the initiator) to another Trading Role (the recipient), the optional exchange of one or more Exchange Blocks between the recipient and the initiator, and the sending of a Response Block to the initiator by the Trading Role that received the Request Block. For more information regarding IOTP, the reader is referred to an Internet-Draft document describing Version 1.0 of the IOTP, published by the Internet Engineering Task Force (IETF) and available at the IETF web site, http://www.ietf.org, as of February, 2000.

The Open Buying on the Internet (OBI, http://www.openbuy.org) standard from the OBI Consortium aims to standardize and secure the corporate purchasing model, especially the high-volume, low-dollar transactions that account for 80% of most organizations' purchasing activities. The goal of OBI is to establish a common ground for what is referred to as "The Trading Web," where OBI standards adopters establish trading relationships with other OBI standards adopters through secured access to extranet facilities connected via the Internet, forming dynamic sets of interoperable systems. OBI defines an architectural approach for e-commerce systems, detailed technical specifications, guidelines for development, record layout formats, file formats, communication structures and protocols, compliance testing guidelines, and implementation assistance. The OBI standard includes precise technical specifications for the security, transport, and contents of OBI Order Requests and OBI Orders. Exchange of OBI Order Requests and OBI Orders is accomplished via HTTP using the SSL (Secure Sockets Layer) protocol to secure communications on the Internet. Within OBI, HTTP is also used for transmission of order documents between servers. In the currently published standard, contents of OBI Order Requests and OBI Orders are based on the ANSI ASC X.12's 850, a standard for an EDI purchase order. The OBI standard includes an implementation convention (IC), a detailed specification for the use of the 850 standard which reflects the consensus of the companies participating in the development of the standard. The Version 2.0 standards document states that the OBI Consortium may provide, in the future, standard order formats based on EDIFACT and/or XML and may add additional document types. For a complete discussion of the OBI technical specifications, consult version 2.0 of the Open Buying on the Internet standard available at www.openbuy.org/obi/specs/obiv2.html.

RosettaNet (information available at the Web site, http://www.rosettanet.org) is an initiative by a consortium of more than thirty companies in the personal computer (PC) industry, ranging from manufacturers to resellers. As part of RosettaNet's foundational projects, two XML data dictionaries are being developed to provide a common set of properties required to conduct business among Consortium members. The first is a technical properties dictionary (technical specifications for all product categories), and the second is a business properties dictionary which includes catalog properties, partner properties (i.e., attributes used to describe supply chain partner companies) and business transaction properties. The goal is a common business language that will link the entire PC industry's supply chain. These dictionaries, coupled with the RosettaNet Implementation Framework (RNIF, an exchange protocol), form the basis for an e-commerce dialog known as the Partner Interface Process or PIP. RosettaNet's PIPs are specialized system-to-system XML-based dialogs that define how business processes are conducted between electronic component and information technology products manufacturers, software publishers, distributors, resellers and corporate end users. The RosettaNet Implementation Framework (RNIF) enables the execution of these electronic business processes by providing strictly defined protocols. These protocols, which are XML DTDs, specify application interaction formats and exchange sequences. Also, this specification includes authentication, authorization, encryption and non-repudiation implementation aspects that are necessary for conducting secure electronic business over the Internet. The purpose of each PIP is to enable the development of interoperable applications by providing common business/data models and documents that enable system developers to implement RosettaNet interfaces. Each PIP includes one or more XML documents based on Implementation Framework DTDs, specifying one or more PIP services, transactions, and messages. A PIP is encapsulated within a header and trailer specified by an agent protocol that facilitates communication between applications that support the RosettaNet agent protocol. Messages are all complete, valid XML documents and are packaged for transport as MIME messages. The RNIF is built on standard Web protocols and accomplishes information exchange between applications using Web servers. A RosettaNet Object (properly configured PIP) may be directly encapsulated into an HTTP message, into an HTML form, or into a CGI name-value pair. Two methods for transferring RosettaNet Objects between Web servers are supported. In the server-to-server method for directly exchanging information between two Web servers, the RosettaNet Object is directly encapsulated by the HTTP protocol at the transport level. In the server-browser-server method for indirectly exchanging information between Web servers via a Web browser (an agent acting on behalf of a user), the RosettaNet Object is encapsulated into an HTML form as a CGI name-value pair, which in turn is exchanged via the HTTP protocol. For further information the reader is referred to the RNIF document designated as version 1.1 and published Nov. 8, 1999, discussing the RNIF in detail, available from the RosettaNet web site.

Private vendors are also implementing XML based e-commerce solutions. Vendors such as Ariba Technologies Inc., Commerce One Inc., and Concur Technologies Inc. are using XML to simplify the process of matching up RFPs and purchase orders over the Web. The Ariba Network platform also provides a range of Internet services for buying and selling organizations, including supplier directories, supplier catalog and content management, access to supplier content, and secure transaction routing. The Ariba Network platform is built around a multi-protocol architecture that allows buyers to send transactions from their Ariba buyer-enabled application in one standard format. The Ariba Network platform then automatically converts the order into the suppliers' preferred transaction protocol, eliminating the need for a single standard for electronic commerce and giving suppliers the freedom to transact in their preferred protocol over the Internet. Ariba Network automatically routes and translates transactions between buying organizations and suppliers using many major e-commerce standards, including Internet Electronic Data Interchange (EDI), VAN-based EDI, Open Buying on the Internet (OBI), secure HTML, e-mail, auto-FAX, Catalog Interchange Format (CIF), and a protocol known as Commerce XML (cXML). cXML defines a set of document type definitions (DTDs) for XML to describe the characteristics of non-production Maintenance, Repair, and Operations (MRO) goods and services. cXML serves as a meta-language to enable the development of "intelligent shopping agents" to assist with the corporate purchasing function. cXML's request/response interaction is used to exchange transaction data between parties. These messages provide support for purchase orders, charge orders, acknowledgements, status updating, shipment notifications, and payment transactions.

BizTalk is an industry initiative started by Microsoft Corporation of Redmond Washington to establish a community of standards users with the goal of driving the rapid, consistent adoption of XML to enable electronic commerce and application integration. The group is defining the BizTalk Framework™, a set of guidelines for how to publish schemas in XML and how to use XML messages to easily integrate software programs together in order to build new solutions. The BizTalk design emphasis is to leverage existing applications, data models, solutions, and application infrastructure, and adapt these for electronic commerce through the use of XML.

FIG. 19 shows a conventional commerce server architecture 700 that supports multiple communications and applications protocols for exchanging information between trading partners 706 and representative service applications 710, 711 and 712. In a typical implementation of commerce server 702, application interfaces 713, 714 and 715 are incorporated as part of the functionality of commerce server 702 to enable server 702 to specifically communicate with applications 710, 711 and 712, respectively. Similarly, communications interface 721 enables server 702 to communicate over communications path 720 with Internet network 707 to reach trading partners A and B, and communications interface 718 enables server 702 to communicate over communications path 722 with EDI network 708 to reach trading partners C and D. These communication interfaces must typically be specially developed to achieve application interoperability.

As described above, there are numerous public and proprietary standardization efforts underway to solve the application interoperability problem in the distributed network environment. Many are XML-based, and most provide application interaction protocols that support and are specific to the interactions required for a particular industry, function or subject matter domain, such as PC supply-chain management or corporate purchasing. These standardization efforts address application interoperability at the transaction or service level and typically support the multiple application layer communications protocols (e.g., HTTP, EDI, etc.) that currently exist in distributed networks today. While these efforts clearly expand the reach of Internet-based e-business to a wider range of enterprises, multiple protocol support still requires extensive software application interface development to enable communications between applications having disparate data requirements over networks using different transport and/or applications communications protocols. What is needed is an application interaction protocol that provides for a common set of generic interactions both to enable full application interoperability in a distributed network environment and to facilitate the automatic processing of today's complex commercial transactions.

SUMMARY OF THE INVENTION

The present invention is premised on the observation that there are at least two basic constituent parts in any e-commerce business model. These are commerce services, such as shopping carts, catalogs, and payment services, and commerce processes, such as catalog updates, purchase order submissions, bids and quotes. A comprehensive e-commerce solution has to integrate these services and processes dynamically, based on configurable interaction definitions. This means that a set of procedures is needed to define the interaction between the applications that establish the services and provide the processes. The present invention is premised on the further observation that an Internet infrastructure solution toward providing the dynamic integration of services and processes should be vendor and platform independent. As noted above, XML and related data representation standardization efforts, combined with industry-based e-commerce standards efforts, are efforts in the direction of an integrated Internet e-commerce environment. But these efforts fall short of the complete integration needed.

The present invention provides for a simple but powerful application interaction protocol that is used to implement secure Internet-wide electronic commerce applications. The protocol is referred to as the Commerce Exchange Interaction Protocol (CXIP) and operates at the application level, providing a formal set of procedures to facilitate functional interoperation among application services and processes.

The CXIP protocol specifies the message types that are exchanged between applications, the semantics of these messages, and the exchange order. The application interaction protocol, which is not specific to any particular functional domain and specifies interactions that are independent of transactional content, includes four component parts: message formats, message types, message exchange semantics and transportation assumptions. In an illustrated implementation of the application interaction protocol, data, object and method invocation requests are exchanged between applications by means of structured documents that use XML tags and that are consistent with the protocol. Messages using XML are machine-readable and can be interpreted in a domain-specific fashion. The exchange of self-descriptive XML messages facilitates document life cycle tracking, which is essential in cross-company commerce activity to support auditing and related activities.

A significant advantage of the application interaction protocol of the subject invention is that it provides a robust foundation on which enterprises and service providers can deliver reliable, scalable, and high performance electronic commerce services to their constituencies. It allows for the delivery of core services and processes that are shared across multiple applications that may be built on disparate operating systems, diverse programming languages and various vendor offerings and legacy systems.

Another important benefit of the application interaction protocol of the subject invention is its simplicity and small footprint. CXIP does not require complex frameworks or supporting infrastructures. The simplicity of the protocol in terms of its messages and their interactions avoids dependence on third party libraries, threading models, and other complications that come with heavily distributed object implementations. Also, the message that comprise the protocol are independent of specific functional domains and may be used to implement application interaction in a variety of functional domains. In addition, applications utilizing CXIP may be implemented using scripting languages such as Perl and Tcl.

Still another important advantage of the present invention is that it supports the three most common types of application interaction models in the e-commerce environment. These models are generally known as request/reply, publish/subscribe and broadcast. The request/reply interaction model allows two parties to exchange information in both synchronous and asynchronous fashion. In a synchronous model, one party (the client) sends a request message to the other party (the server). Upon receipt of the request message, the server party processes it in a predetermined manner and sends back a reply message containing the results. The client party waits until it receives the response from the server party. This interaction model is also called the blocking interaction model. In asynchronous interaction, upon receipt of the request message from the client, the server party responds to the request immediately, before acting upon the request. The response typically contains tracking information that allows the requesting party to query the status of the service request. This model is also called the offline, or non-blocking, model. In this interaction model, the receiving application has the capability of implementing either synchronous or asynchronous requests. In a publish/subscribe interaction model, two applications interact via an intermediary party. The applications that are interested in specific information register with the intermediary party. The information generating application posts, or publishes, the information to the intermediary, which in turn passes this to the interested parties. In this model, the information requestor and the information supplier never interact directly. The broadcast model is a special case of a model known as the multicast model, both of which send a message to a group of parties. When the group size is less than the entire membership of a domain, a message is broadcast to the group; when the group size equals the entire membership, sending the message to the entire group is referred to as multicasting. The message sent in this type of interaction model is typically one of two types: a request message, resulting in a reply message returned, or a notify message that simply reports information or events. Note also that in the multicast interaction model, the recipient group may or may not be subscription based. The information receiver application determines this from the content of the broadcast message. The present invention provides for a set of message types that support all three interaction models.

Therefore, in accordance with one aspect of the present invention, a method is provided for operating a first computer to manage application-to-application communication among a plurality of requesting application programs and a plurality of service application programs. The method comprises receiving transaction request data indicating a transaction from a requesting application program, and determining a message type using the transaction request data. The message type is one of a plurality of message types collectively defining an application interaction protocol implementing a request-reply, a publish-subscribe, and a broadcast application-to-application interaction between the requesting application and a service application. Each of the request-reply, publish-subscribe, and broadcast-multicast application-to-application interactions indicating a predetermined sequence of structured documents exchanged between the requesting application and the service application. The method further comprises producing, sending and receiving an ordered sequence of structured documents according to at least one of the request-reply, publish-subscribe, and broadcast-multicast application-to-application interactions of the application interaction protocol. The ordered sequence of structured documents causes the transaction to be performed by the service application and a transaction response to be sent to the requesting application.

In another aspect of the method invention, the plurality of message types include Request, Reply, Publish, Notify, Subscribe and Unsubscribe. In still another aspect of the method invention, when the ordered sequence of structured documents is produced according to the broadcast-multicast application-to-application interaction of the application interaction protocol, at least one of the structured documents is a Notify structured document having a message type of Notify and indicating transaction data to be sent to a subscriber list of service applications. The method for managing application-to application interaction then further includes selecting all service application programs on the subscriber list from among the plurality of service application programs, and sending the Notify structured document to the subscriber list of service application programs to process the transaction data.

In another aspect of the invention, there is provided a system for managing application-to-application communication among a plurality of application programs resident on a plurality of computers in a distributed computer network. The system comprises at least one requesting application program resident on one of the plurality of computers in the distributed computer network, and at least one service application program resident on one of the plurality of computers in the distributed computer network. The requesting application program is capable of producing a transaction request indicating a transaction, and the service application program is capable of performing the transaction and producing a transaction response. The system further comprises a plurality of structured documents each indicating a communication to one of the requesting application and the service application. Each structured document includes one of a plurality of message types collectively defining an application interaction protocol implementing a request-reply, a publish-subscribe, and a broadcast-multicast application-to-application interaction between the requesting application and the service application. Each of the request-reply, publish-subscribe, and broadcast-multicast application-to-application interactions indicates a predetermined sequence of structured documents exchanged between the requesting application and the service application. The system further comprises a process automation application resident on one of the plurality of computers in the distributed computer network. The process automation application produces and sends a sequence of structured documents according to at least one of the request-reply, publish-subscribe, and broadcast-multicast application-to-application interactions of the application interaction protocol to cause the transaction to be performed by the service application and the transaction response to be sent to the requesting application.

In still another aspect of the system of the present invention, the structured document data structure of the system uses Extensible Markup Language (XML) tags indicating control data and input-output data. The control data tag indicates the message type of the transaction message and a service type, and the input-output data tag indicates input data required by the service type and output data produced by the service type. In still another aspect of the invention, there is provided an XML application interaction message document stored on a computer-readable medium comprising a message header data portion indicating message-content size data, and a message content data portion indicating a message type. The message type has one of a plurality of message type values collectively defining an application interaction protocol implementing a request-reply, a publish-subscribe, and a broadcast-multicast application-to-application interaction between a requesting application and a service application. The message content data portion further indicates transaction request data, which, when parsed by a process automation application, causes the process automation application to produce an ordered sequence of XML application interaction message documents according to at least one of the request-reply, the publish-subscribe, and the broadcast-multicast application-to-application interaction. The process automation application controlling exchange of the ordered sequence of XML application interaction message documents between the requesting application and the service application.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps.

DETAILED DESCRIPTION OF THE INVENTION

The detailed description assumes a basic understanding of terms and acronyms related to the Internet and software development in the Internet environment. A glossary of terms and acronyms that are used is this document is provided in the Appendix of Terminology at the end of this detailed description. When a term in the description or in a claim has more than one common meaning and also appears in the glossary, the definition in the glossary indicates the controlling meaning, rather than any meanings that may occur in other sources, such as, for example, documents, if any, that are incorporated by reference herein elsewhere in this description.

1. A Commerce Server Architecture Utilizing the Application Interaction Protocol a. Process Components.

Figure 1:
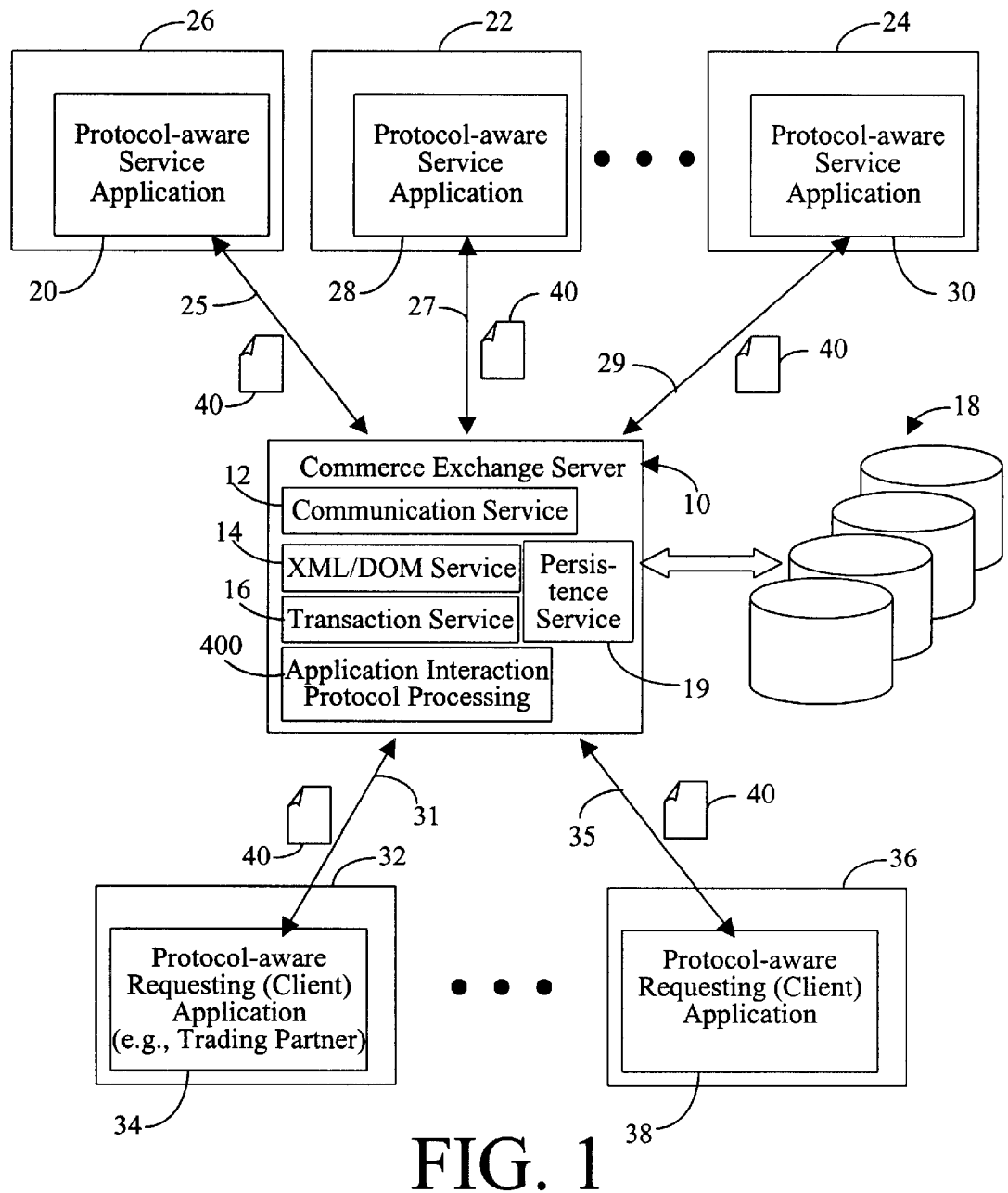
FIG. 1 is a block diagram schematically illustrating a systems architecture for enabling application-to-application interaction in a distributed computer network according to the present invention.

FIG. 1 illustrates a representative system architecture for enabling application-to-application interaction in a distributed computer network. Specifically, the system architecture of FIG. 1 illustrates an inter- or intra-enterprise Internet-based electronic commerce architecture including process automation application 10, referred to as a commerce exchange (CX) server. CX server 10 operates as a type of clearinghouse, receiving service requests posted by client components 34 and 38 and directing them to appropriate service components 20, 28 and 30 identified ("signed up") to CX server 10 as being available to perform those services. In this capacity, much of the processing performed by CX server 10 involves searching for service component by service operation and searching for client components by their identification numbers. CX server 10 also performs a variety of administrative functions including transaction tracking and audit functions and disaster recovery functions.

Each application component is referred to as a commerce exchange component, or CXC. As shown in FIG. 1, there may be any number of CXCs identified to CX server 10. A CXC application either provides one or more services or originates a transaction request, or both. A CXC application may be integrated with CX server 10 as a built-in component residing on the same machine or it may be a third party application resident on a different machine. For example, service application 30 is resident on machine 24 and accessible to CX server 10 via communications connection 29, and requesting application 38 is resident on machine 36 and accessible to CX server 10 via communications connection 35. The type of architecture model illustrated in FIG. 1 may be variously described in the literature as an information bus model, a client-server model or a cooperative agent model.

CX server 10 includes several processing services: Communication service 12; XML/DOM service 14; Transaction service 16; and Persistence service 19. Transaction service 16 provides interfaces for working with transaction logic, tracking a transaction thread, traversing transaction logic and performing transaction execution. The basic unit of work in CX server 10 is a transaction. A transaction is a set of one or more operations, or services, that can be performed by participating CXCs. The terms operation and service are used interchangeably herein to mean an atomic process that acts upon the input data to achieve a unit level function. A service list is a description of a function in terms of services and the conditions, communication paths and exceptions associated with their execution. CX server 10 provides a virtual workspace, or transaction execution space, to participating CXC applications. A CXC submits a transaction request based on a published CX transaction document type declaration (DTD). Upon receipt of a transaction, CX server 10 identifies the series of service requests that comprise the transaction based on a transaction definition in data store 18, and then executes the transaction by providing service requests to CXCs identified as signing up to process the respective services. Each invoked CXC performs the specified service request(s) and sends back results to CX server 10, which, after completion of all service requests, returns the transaction results back to the originating CXC. A transaction definition takes the form of a directed acyclic graph. CX server 10, with knowledge of the transaction logic from the transaction definition, controls all processing decisions including which operations to perform, to which CXC to forward a service request, how to process the conditions on the services, which information to pass and receive, and when to terminate processing.

Communication service 12 provides interfaces for accepting and establishing connections, and sending and receiving messages through various network transport protocols. In an illustrated implementation of CX server 10, the network transport protocol supported is TCP/IP, but other transport protocols may be supported as well. Communication service 12 also provides a variety of other communications-related services including notification of broken connections, fragmentation and assembly of messages, and connection-level session management and handshaking functions.

CX server 10 also includes an application interaction processing operation 400. CX server 10 is a document-centric process automation application, exchanging messages in the form of XML application interaction documents 40 between CXCs. These XML documents form the underlying application interaction protocol, referred to as the Commerce Exchange Interaction Protocol, hereafter CXIP. As is described in more detail below, CXIP supports the Request/Reply, Publish/Subscribe and Broadcast (Notify) models of interaction. Each CXC includes a software interface for extracting transaction data from XML document 40. The architecture of a CXC component is described in the discussion accompanying FIG. 2 below. Standardizing application interaction in this manner allows for the straightforward integration of third party applications as CXCs, without the absolute requirement for application-specific libraries.

XML/DOM service 14 provides interfaces and services for handling the XML documents 40 that form the basis of the application interaction protocol. Services include parsing and constructing XML documents, and building and accessing DOM (Document Object Module) object trees. XML/DOM service 14 may make use of any public domain XML parser. Although the XML-based document format is primarily used for exchanging active messages, some internal data used by CX server 10 are also represented and stored as XML documents. For example, the transaction directed acyclic graph that defines the component services of a transaction is an XML document. Therefore, other service components, such as transaction service 16, may use XML/DOM service 14 for translation between XML syntax and an internal data format requirement.

Persistence service 19 provides interfaces for storing information into and retrieving information from external data stores 18. From the perspective of CX server 10 or a CXC, data entering into or coming from data stores 18 are in XML document format. Persistence service 19 has the responsibility of mapping between an XML document and the respective data store schema. In an illustrated implementation of CX server 10, data stores 18 include a Netscape™ message server, a Netscape™ LDAP server, and an Oracle™ database server. Support for flat files is also possible. Examples of information that are included in data stores 18 are system parameters, events and alerts, and transaction definitions.

b. Process and Threading Models.

CX server 10 executes as a single process that listens to one listener port and one administrative port for application interaction messages. The single process model distinguishes CX server 10 from conventional application servers that follow the traditional multi-process model. The single process model is critical to the implementation of conditional-logic transaction processing and the complexities of event notification and process control over the CXCs. Moreover, the single process model simplifies administration of the CX server 10 by the system administrator, and is more efficient in database access than a multi-process model. In addition, a single multi-threaded process is typically more efficient than multiple single or multi-threaded processes because it uses fewer system resources such as memory and disk space, assuming that each thread is scheduled as having the same priority as the kernel thread. The capability of deploying a backup CX server addresses the problem of a single point of failure caused by using a single process model.

CX server 10 supports both a single-thread and multi-thread model. A single-threaded CX server listens to both the administrative and listener ports at the same time and processes incoming request one after another, in serial fashion. Priority processing is not supported and event processing support is restricted. The single-thread model does not allow for the CX server to load CXC libraries. The multi-threaded CX server uses multiple threads for listening and accepting connections from the administrative port, listening and accepting connections from the listener port, listening and receiving messages from established connections, priority processing of transactions (messages), and executing CXC libraries loaded as part of the process. The multi-threaded model supports both serial and non-serial processing of requests. Serial and non-serial processing are distinguished by whether the message listening thread waits for termination of the thread that is created to process the message. Threading and serialization are determined by configuration parameters provided at startup.

In one embodiment of CX server 10, a commerce exchange component (CXC) is expected to establish a persistent connection, throughout the lifetime of the CXC, to the CX server and to use the connection for all application interactions. The CX server uses the connection to determine the existence of the CXC in the network. Each message received through a persistent connection is processed concurrently using an independent thread. This implementation improves message-processing performance, minimizes the usage of system resources, and eliminates the overhead of establishing and terminating a connection for each new request (i.e., the thrashing effect).

In the illustrated implementation of CX server 10 herein, CX server 10 supports asynchronous transaction processing. That is, when an operation request is sent from CX server 10 to a CXC, the processing thread does not block for a response from the CXC and instead sets the state of the transaction and exits from the thread. When a response message is received, the transaction is executed based on the state and the type of response. Asynchronous transaction processing is illustrated below in the description accompanying the Request/Reply message interaction shown in FIG. 6, FIG. 7 and FIG. 8. Support for asynchronous transaction processing achieves efficiency from the single shared connection between CX server 10 and a CXC. Requests may be sent from the CX server simultaneously in multiple threads and the responses may be returned in any order according to how the CXC process them, without waiting for the requests to be performed serially. In addition, timer events may be introduced more easily, thus creating an event-driven processing model.

c. Distributed Transaction Processing Support.

CX server. 10 supports true distributed transaction processing. A CX server in one enterprise or network may communicate with a CX server in another enterprise or network to cooperatively fulfil transaction requests. Thus, an instance of CX server 10 that cannot fulfil a service component of a transaction request with a participating CXC in its own domain may send the service request to another instance of the CX server (not shown in FIG. 1) that includes a participating CXC that has the capability to perform the service. This feature enables an enterprise or group of enterprises to deploy cooperating commerce exchange applications.

2. The Application Interaction Protocol Specification a. Message Transport Architecture.

The basic transport assumption in the application interaction protocol, CXIP, used by CX server 10 is the guaranteed delivery of messages. As long as this requirement is satisfied, the underlying transport protocol may be any standard communications protocol. The present implementation of CXIP is based on TCP/IP. In this implementation, CXIP messages are transmitted as TCP data between applications. However, CXIP may also be implemented on top of other transport mechanisms such as SMPT and FTP. To enable HTTP-based interactions a MIME type may be defined, such as application/x-cxip-v10, and it is straightforward to develop a browser plug-in to handle CXIP messages.

b. Application Interaction Architecture.

Figure 2:
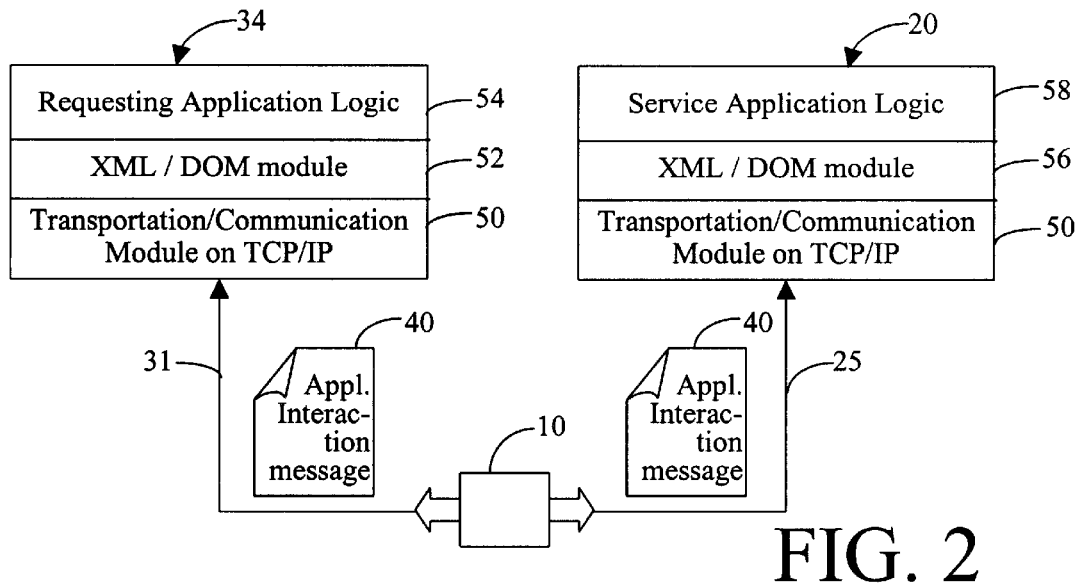
FIG. 2 is a block diagram of the application architecture that accomplishes application interaction according to an illustrated implementation of the present invention.

FIG. 2 illustrates a representative configuration of the application architecture required to implement the application interaction protocol in a distributed computer network such as the Internet. This application architecture makes use of the Document Object Model (DOM), a platform- and language-neutral application programming interface (API) for HTML and XML documents that models these documents using objects. The DOM provides a standard set of objects for representing HTML and XML documents, a standard model of how these objects can be combined, and a standard interface for accessing and manipulating them. As an object model, the DOM identifies the semantics of these interfaces and objects, including both behavior and attributes, and the relationships and collaborations among these interfaces and objects. The DOM allows for building documents, navigating their structure, and adding, modifying, or deleting elements and content. Data found in an HTML or XML document can be accessed, changed, deleted, or added using the Document Object Model. The DOM may be implemented using language-independent systems like COM or CORBA; it may also be implemented using language-specific bindings. A DOM implementation (also called a host implementation) is that portion of software that takes the parsed XML or HTML document and makes it available for processing via the DOM interfaces. A browser contains a hosting implementation, for example. A DOM application (also called a client application) is that portion of software that takes the document made available by the implementation, and performs an operation with it. A script that runs in a browser is an example of an application. Because of its platform- and language-independent format, the DOM is used as an interface to proprietary data structures and APIs, instead of product-specific APIs, in order to achieve application interoperability with less effort. Additional information regarding the DOM may be found at http://www.w3.org/DOM/.

Returning now to FIG. 2, applications 34 and 20 are CXCs in a commerce exchange domain as described with respect to FIG. 1. Each application includes transportation/communication module 50 for handling the syntax and semantics of XML document 40 received from CX server 10 over a TCP/IP transport mechanism. Transportation/communication module 50 receives XML document 40 as TCP/IP data and returns an XML document. In application 34, XML/DOM module 52 receives the XML document output produced from transportation/communication module 50, parses the document and returns one or more DOM objects that are passed to application logic 54 for handling as standard program objects. Similarly, in application 20, transportation/communication module 50 receives XML document 40 as TCP/IP data via communications path 25 and returns an XML document. XML/DOM module 56 then receives the XML document output produced from transportation/communication module 50, parses the document and returns one or more DOM objects that are passed to application logic 58 for handling as standard program objects. Thus, the component module application architecture of FIG. 2 enables any third party application to be straightforwardly integrated as a commerce exchange component (CXC) in the domain of a commerce exchange server. Development of these component modules is technically straightforward in either a Java or a C++ implementation.

Figure 18:
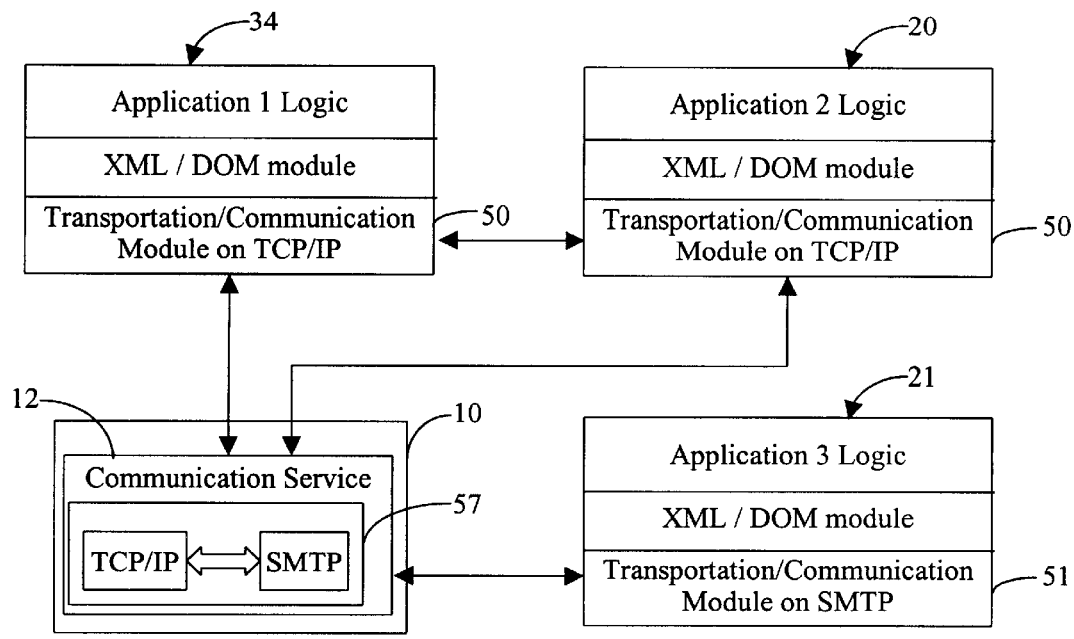
FIG. 18 is a block diagram illustrating the bridging function of a component of the commerce exchange server of FIG. 1 that translates application interaction messages between standard message transport protocols according to an illustrated implementation of the present invention.
Figure 19:
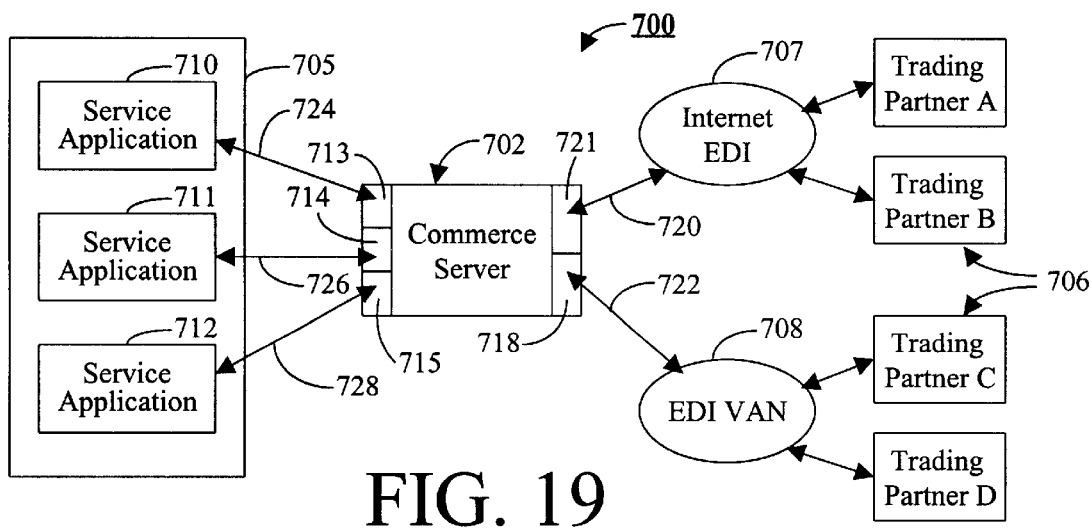
FIG. 19 is a block diagram of a conventional commerce server systems architecture for enabling application-to-application interaction.

As noted above, the transportation module 50 is based on TCP/IP, but need not be restricted as such. Because the application interaction protocol includes guaranteed delivery semantics (see the Acknowledge message type described below), transportation module 50 may be implemented on top of SMTP or FTP as well. Cooperating applications (CXCs) based on different transportation mechanisms may also be implemented by developing a bridge that translates messages from one protocol to another. FIG. 18 illustrates this concept of protocol translation. Commerce exchange components 34 and 20 reside on a network that utilizes TCP/IP as its transport mechanism, while commerce exchange component 21 resides on a network that utilizes SMTP as its transport mechanism. Commerce exchange component 21 includes transportation/communication module 51 for handling messages in SMTP format. Communication service 12 of CX server 10 may be implemented with bridge mechanism 57 for translating messages between TCP/IP and SMTP message formats.

c. Message DTDs.

Figure 3:
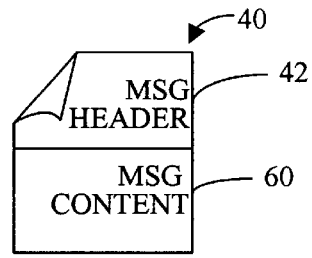
FIG. 3 schematically illustrates the general component portions of the XML-based document that functions as a protocol message according to an illustrated implementation of the present invention.
Figure 4:
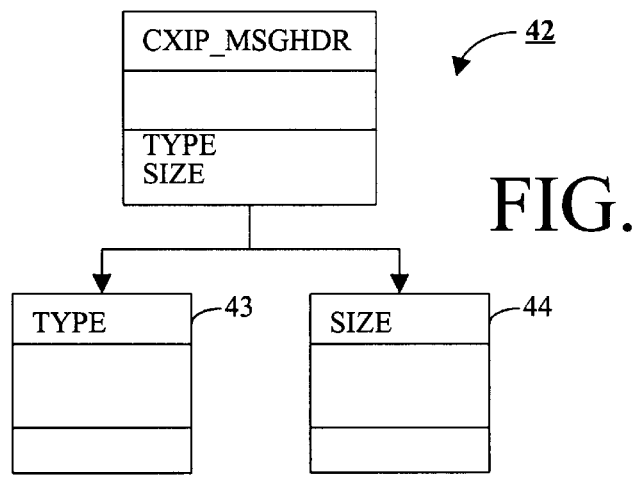
FIG. 4 is a block diagram of the message header portion of a protocol message according to an illustrated implementation of the present invention.

As shown in FIG. 3, XML document 40 contains tags that define a message header 42 and message content 60. Each of these parts has an associated DTD. The structure of each of these two parts should be well-formed and valid with respect to its associated DTD. Message header DTD, illustrated in FIG. 4, includes tags that specify the two elements 43 and 44 of type and size that describe the associated message content. In an illustrated implementation of the application interaction protocol, (CXIP version 1.0), field type entity 43 is a placeholder for future use. The value of field size 44 indicates the length of the associated message content 60 in byte counts. Message header 42 is fixed in length, and, in CXIP version 1.0, message header length is 128 bytes. As previously described, CXIP messages may use TCP/IP as their underlying transport mechanism. Since message length varies by content, a fixed length message header allows the receiver to easily determine the end of a message without having to test for a special message-termination character. Table 1 shows the Message Header DTD.

TABLE I

MESSAGE HEADER DTD

```
<!DOCTYPE CXIP_MSGHDR [
    <!ELEMENT CXIP_MSGHDR  (TYPE, SIZE)>
        <!ELEMENT TYPE (#PCDATA)>
        <!ELEMENT SIZE (#PCDATA)>
] <
```

Figure 5:
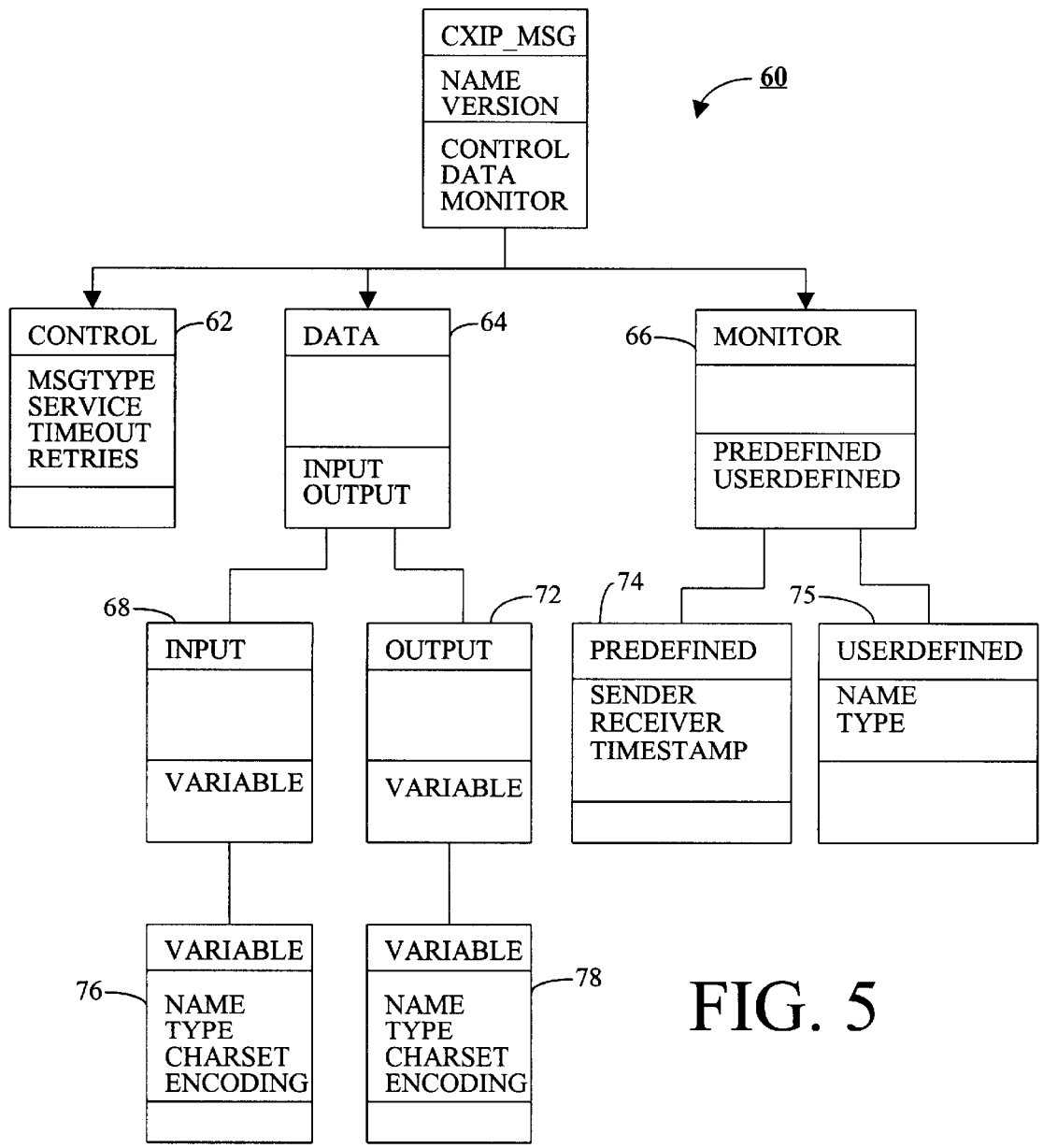
FIG. 5 is a block diagram of the message content portion of a protocol message according to an illustrated implementation of the present invention.

The CXIP message content DTD 60, schematically illustrated in FIG. 5 and shown in Table 2 below, defines three sections, or elements, and their attributes that describe one or more actions a receiver of the message is to perform. The three sections are the CONTROL section 62, the DATA section 64 and the MONITOR section 66. The CONTROL section 62 is an element that specifies the type of message (MSGTYPE), the intended service of the message (SERVICE), and certain application logic parameters (TIMEOUT, RETRIES) directing how the service is to be performed. An additional element that deals with multi-part messages may also be included in the CONTROL section. The DATA section 64 is an element for the required data of the message service. The DATA section includes two sub-sections, INPUT sub-section 68 and OUTPUT subsection 72, for the data required by the service and for the data resulting from the service, respectively. This data is specified by the tag element VARIABLE, defined in sub-sections 76 and 78 to include information about the input and output data, respectively, including the tags NAME, TYPE, CHARSET and ENCODING. The MONITOR section 66 is used for tracking purposes. This section is optional and has sub-sections for both pre-defined and user-defined parameters. The PREDEFINED sub-section 75 contains information such as TIMESTAMP, SENDER and RECEIVER. The USERDEFINED sub-section 75 may occur multiple times in the MONITOR section 66 and contains NAME, TYPE and the data fields for application specific information.

TABLE 2

MESSAGE CONTENT DTD

```
<!DOCTYPE CXIP_MSG  [
    <!ELEMENT CXIP_MSG    (CONTROL, DATA, MONITOR)>
    <!ATTLIST    CXIP_MSG
        NAME     CDATA
        VERSION  (1.0 | . . .) "1.0"
>
    <!ELEMENT CONTROL      EMPTY>
    <!ATTLIST CONTROL
        MSGTYPE   CDATA    #REQUIRED
        SERVICE   CDATA    #IMPLIED
        TIMEOUT   CDATA    #IMPLIED
        RETRIES   CDATA    #IMPLIED
>
    <!ELEMENT DATA      (INPUT, OUTPUT)>
    <!ELEMENT INPUT             (VARIABLE)*>
    <!ELEMENT OUTPUT            (VARIABLE)*>
        <!ELEMENT VARIABLE (#PCDATA)>
```

TABLE 2-continued

MESSAGE CONTENT DTD

```
    <!ATTLIST VARIABLE
        NAME      CDATA     #REQUIRED
        TYPE      (STRING | INTEGER |
                  BINARY) "STRING"
        CHARSET   (8859.1 | . . .)  "8859.1"
        ENCODING  (Base64 | . . .)  "Base64"
    >
    <!ELEMENT MONITOR (PREDEFINED?,
                USERDEFINED*)>
        <!ELEMENT PREDEFINED EMPTY>
        <!ATTLIST PREDEFINED
            SENDER     CDATA    #IMPLIED
            RECEIVER   CDATA    #IMPLIED
            TIMESTAMP  CDATA    #IMPLIED
    >
        <!ELEMENT USERDEFINED  (#PCDATA)>
        <!ATTLIST USERDEFINED
            NAME       CDATA    #REQUIRED
            TYPE       CDATA    #REQUIRED
    >
]>
```

Both the message header and the message content of a CXIP message are in the data representation format specified by XML, which is presumed to be an 8-bit character format in the present implementation. As previously discussed with respect to FIG. 2, the encoding, translating and interpreting of the input and output parameter data types is the responsibility of the application that sends or receives a CXIP message.

d. CXIP Message Types.

The MSGTYPE attribute of CONTROL section 62 (FIG. 5) in a CXIP message specifies the type of message being sent. An illustrated implementation of CXIP supports eight (8) message types that implement the three most common application interaction models (Request/Reply, Publish/Subscribe and Broadcast) in the distributed network environment. These eight message types are Request, Reply, Cancel, Publish, Notify, Subscribe, Unsubscribe, and Acknowledge. Table 3 below provides the receiver's response to each of these message types and a description of the application interaction related to each of these message types. FIG. 6 and FIGS. 9 through 12 use simple block diagrams to schematically illustrate the application interaction related to each of these message types. In each of FIG. 6 and FIGS. 9 through 12, requesting application 34 and service application 20 may exchange messages through CX server 10 (not shown). Each message type 90, 91, 92, 94, 95, 96, 97 and 98 is an XML document of the type illustrated by the DTDs of Tables 1 and 2 above. The message types that comprise the valid commands of the application interaction protocol of the subject invention specify interactions between a requesting application and a service application that are not specific to any particular functional domain. They specify interactions that are independent of the underlying transactional or data content or subject matter of the application domain, and so they provide a message exchange mechanism that functions in all transactional domains. This characteristic of the application interaction protocol is referred to as its transactional-content-independence.

Many XML-based standards efforts such as those that are discussed in the Background section above, define transaction protocols that are based on specific subject matter domains such as purchasing, supply chain management or financial transactions, or on the subject-matter dependent roles of the participants, such as payor-payee or purchaser-broker. In contrast, the application interaction protocol of the present invention presents an interaction model that is independent of the subject matter domain and participants' roles in the transactions. While transaction-specific data is necessarily defined and provided within the content of the XML message (e.g., SERVICE attribute specifying the intended service type of the message), CX server 10 manages message type sequencing and timing according to the more generic values of the MSGTYPE attribute.

Figure 6:
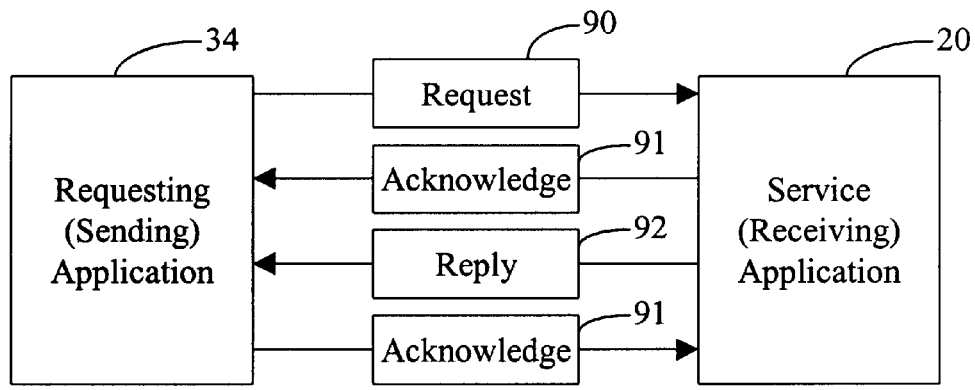
FIG. 6 illustrates the application interaction semantics for Request and Reply messages according to an illustrated implementation of the present invention.

In FIG. 6, requesting application 34 sends a Request message 90 to service application 20. Request message 90 encodes service invocation semantics in the message. The SERVICE attribute of the CONTROL section specifies the target service, and the INPUT element of the DATA section contains arguments required to perform the service. Service application 20 sends an Acknowledge message 91 in response to receipt of a Request message. FIG. 6 then shows service application 20 sending a Reply message 92 to originating application 34 after completion of and in response to the service invoked by Request message 90. A Reply message 92 may include input and output parameters, service results, request status, and other application-specific data. Application 34 sends an Acknowledge message 91 in response to receipt of a Reply message 92.

Figure 7:
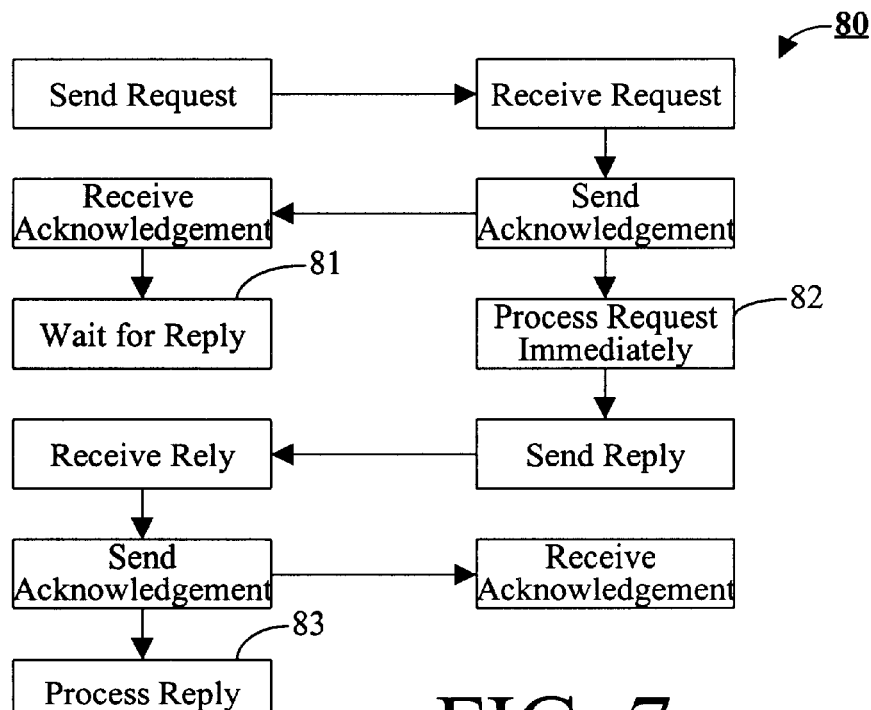
FIG. 7 schematically illustrates the synchronous model of message interaction according to a first implementation of the Request and Reply message semantics of FIG. 6.
Figure 8:
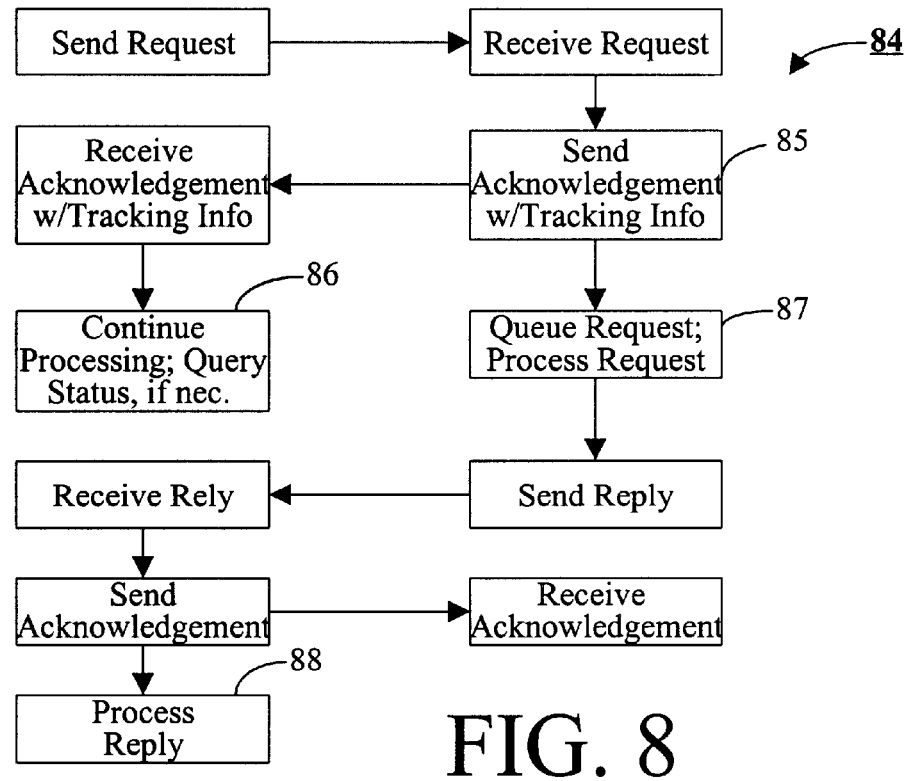
FIG. 8 schematically illustrates the asynchronous model of message interaction according to a second implementation of the Request and Reply message semantics of FIG. 6.

Each of the three interaction models (Request/Reply, Publish/Notify and Subscribe/Unsubscribe) may be implemented according to either a synchronous or an asynchronous model. These different processing models are illustrated in FIG. 7 and FIG. 8 using the Request/Reply interaction model of FIG. 6. In the synchronous model 80 illustrated in the process flow chart of FIG. 7, the sending party, whose acts are shown on the left side of the process flow, sends a request message to a receiving party (the service application), shown on the right side of the process flow. Upon receipt of the request message, the receiving party sends an acknowledgement message, and then processes the request, in box 82, immediately in a predetermined manner, sending back a reply message containing the results. Meanwhile, the requesting party waits, and does no further processing of its own, in box 81, until it receives the reply. The requesting party then processes the results of the request, in box 83. This interaction model is also called the blocking interaction model.

In the asynchronous interaction model illustrated in FIG. 8, upon receipt of the request message from the requesting party, the service application sends an acknowledgement message with request tracking information to the requesting party immediately, in box 85. The requesting party may then continue other processing, in box 86, and may use the tracking information to query the status of the service request, if necessary. The service application queues the request, in box 87, and then processes the request according to a priority schedule. When request processing is completed, the service application sends a reply message to the requesting party, who receives the reply, sends an acknowledgement, and then may process the reply, in box 88. The asynchronous Request/Reply model is also called the offline, or non-blocking, model.

Figure 9:
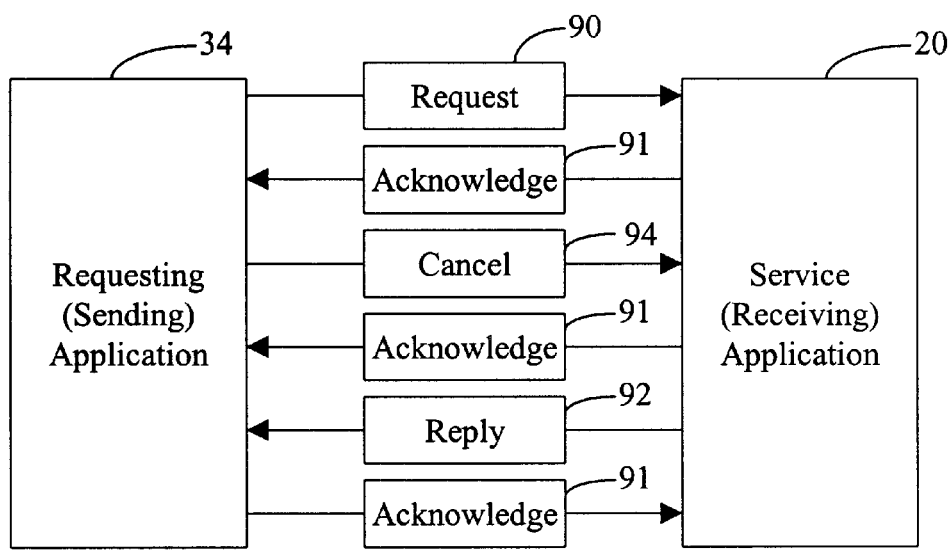
FIG. 9 illustrates the application interaction semantics for a Cancel message in the context of Request and Reply messages, according to an illustrated implementation of the present invention.

A Cancel message 94, shown in FIG. 9, is used to cancel a previously sent Request message 90. Service application 20 immediately sends an Acknowledge message 91 in response to receipt of a Cancel message 94. For each Cancel message 94, service application 20 eventually sends a Reply message 92 to inform application 34 of the disposition of the cancellation process. The Reply message 92 may indicate that the process has been successful, has failed or is unsupported. The receiving party sends Acknowledgement message 91 in response to Reply message 92.

Figure 10:
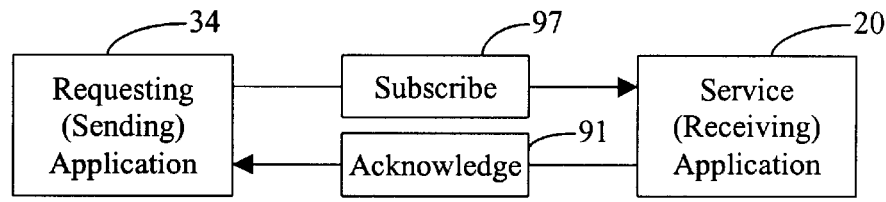
FIG. 10 illustrates the application interaction semantics for a Subscribe message according to an illustrated implementation of the present invention.

FIG. 10 illustrates a Subscribe message 97 sent by requesting application 34 to service application 20. The Subscribe message 97 is used to request notification of a specific event. Service application 20 immediately sends an Acknowledge message 91 in response to receipt of a Subscribe message 97. Service application 20, as the receiving party, eventually relays the event or events through a Notify message 96 (FIG. 11) to each of the subscribers to the event(s).

Figure 11:
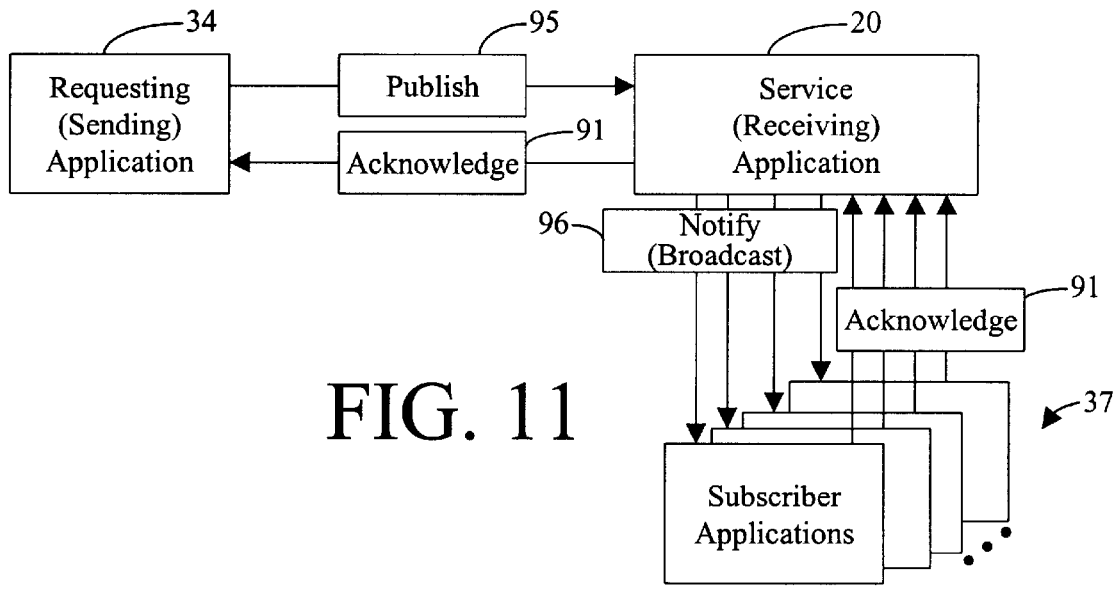
FIG. 11 illustrates the application interaction semantics for Publish and Notify messages according to an illustrated implementation of the present invention.

FIG. 11 illustrates the Publish message 95 and the Notify message 96. A Publish message 95 sent by requesting application 34 embeds one or more events in its content section. Service application 20 immediately sends an Acknowledge message 91 in response to receipt of a Publish message 95. Service application 20, as the receiving party, eventually relays the event or events through Notify message 96 to each of the subscribers 37 to the particular event. A Notify message 96 is used to report the occurrence of one or more events. The Notify message may result from a specific trigger event, or from receipt of a Publish message 95. Each of the receiving parties 37 of a Notify message immediately sends an Acknowledge message 91 to service application 20 in response to receipt of Notify message 96.

Figure 12:
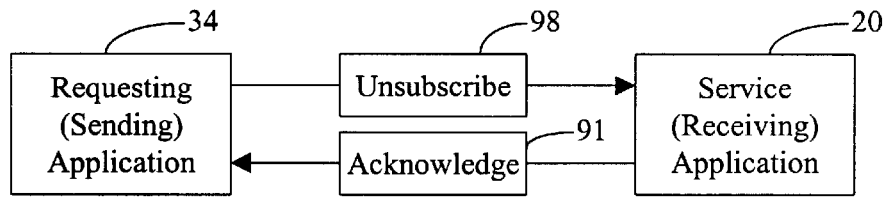
FIG. 12 illustrates the application interaction semantics for a Unsubscribe message according to an illustrated implementation of the present invention.

The Unsubscribe message 98, illustrated in FIG. 12, is used to unsubscribe from a previously subscribed event. As with the other message types, service application 20 immediately sends an Acknowledge message 91 in response to receipt of an Unsubscribe message 98. As illustrated in each of these figures, the Acknowledge message 91 is a special type of message used to acknowledge receipt of all of the other message types. As previously noted, Acknowledge message 91 may contain any information needed for tracking purposes, such as for querying the status of a prior request, or purposes of establishing an audit trail or transaction log. An application should follow the application interaction protocol by sending an Acknowledge message 91 for each received message, except for the Acknowledge message itself.

TABLE 3

| Sender Message | Receiver's Response | Description |
| --- | --- | --- |
| Request | Acknowledge | Sender (Client) requests a service and the Receiver (Server) sends an acknowledgement to that request. |
| Reply | Acknowledge | Sender (Server) responds to a service request and the Receiver (Client) returns an acknowledgement. |
| Cancel | Acknowledge | Sender (Client) requests to cancel a service request and the Receiver (Server) acknowledges the cancel request |
| Publish | Acknowledge | Sender (Publishing Agent) publishes an event to the Receiver (Broker). Receiver (Broker) acknowledges the message. |
| Notify | Acknowledge | Sender (Broker) notifies the subscribed Receiver(s) of an event. Receiver(s) acknowledge receipt of the message. |
| Subscribe | Acknowledge | Sender (Subscriber) sends a Subscribe message and Receiver (Broker) sends an acknowledgement. |
| Unsubscribe | Acknowledge | Sender (Subscriber) sends a Unsubscribe message and Receiver (Broker) sends an acknowledgement. |

TABLE 3-continued

| Sender Message | Receiver's Response | Description |
| --- | --- | --- |
| Acknowledge | Not Applicable | Sender sends an acknowledgement message and expects nothing in return. |

Figure 13:
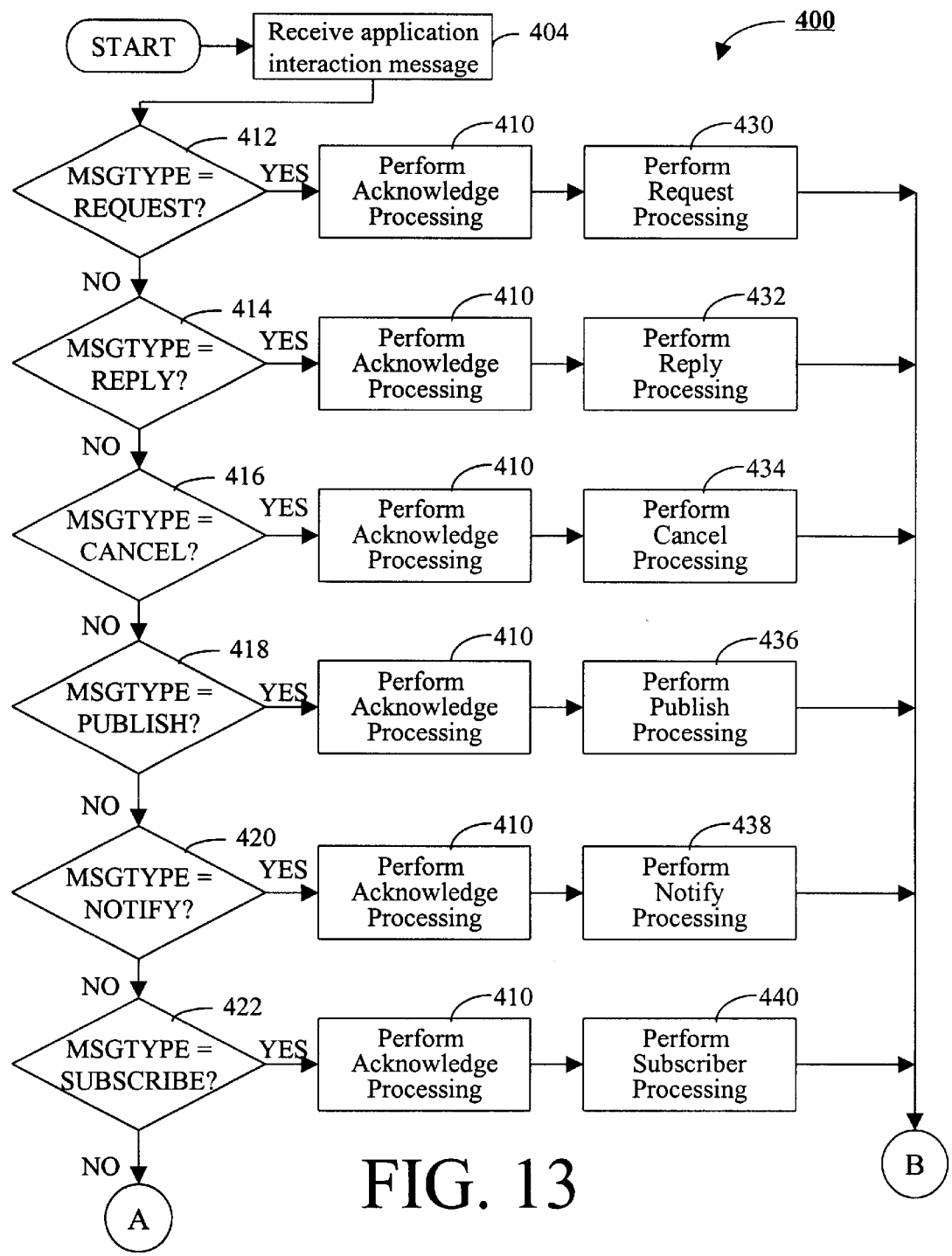
FIG. 13 is a flow chart illustrating message processing, including determining the message type, according to an illustrated implementation of the present invention.
Figure 14:
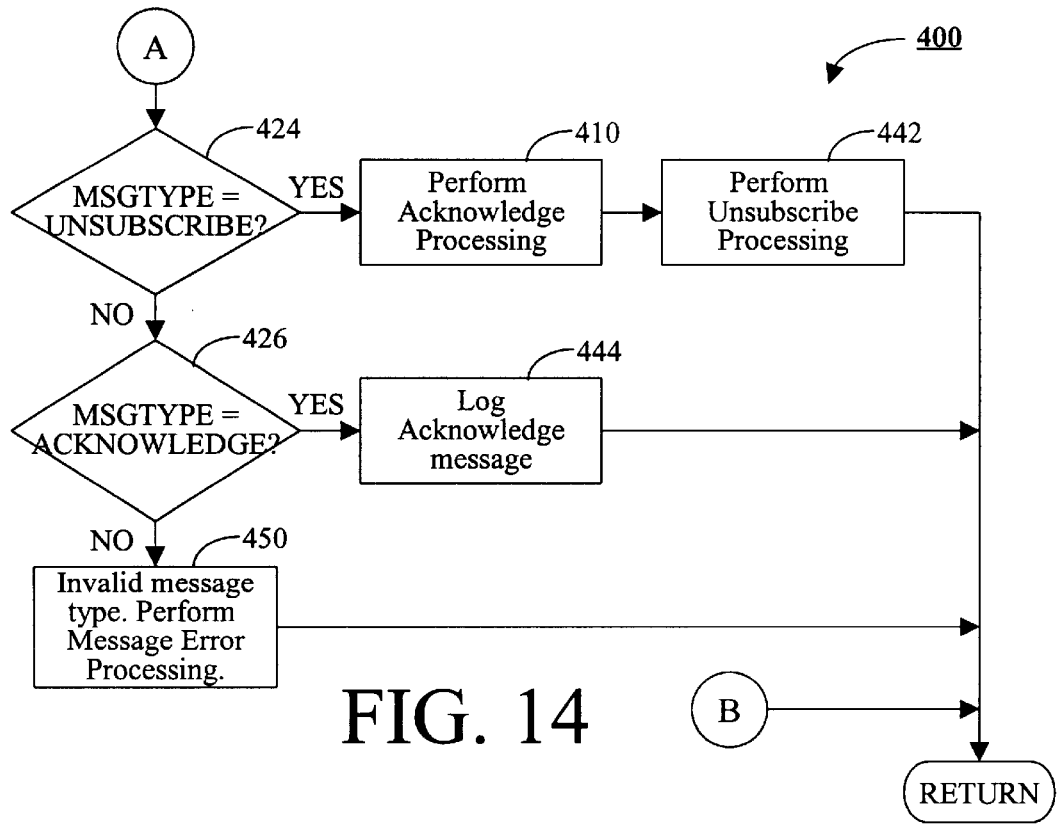
FIG. 14 is a flow chart showing the continuation of the flowchart of FIG. 13.

Commerce exchange server 10 of FIG. 1 performs interaction protocol processing operation 400 to control the flow of these messages among requesting and service applications (the CXCs) identified to CX server 10. The general processes of interaction protocol processing operation 400 are illustrated in the flowcharts of FIGS. 13 and 14. After receiving the protocol message in box 404, operation 400 tests for the appropriate valid MSGTYPE in query boxes 412, 414, 416, 418, 420, 422, 424 and 426. If the MSGTYPE is not equal to any of the valid message types, an error occurs and message error processing is performed in box 450 of FIG. 14. For valid message types, operation 400 performs acknowledge message processing operation 410 for all valid messages except for an Acknowledge message, and then proceeds to process the message according to its type, as generally illustrated in FIGS. 6 through 12.

3. Application Interaction Example Using the Application Interaction protocol

Figure 15:
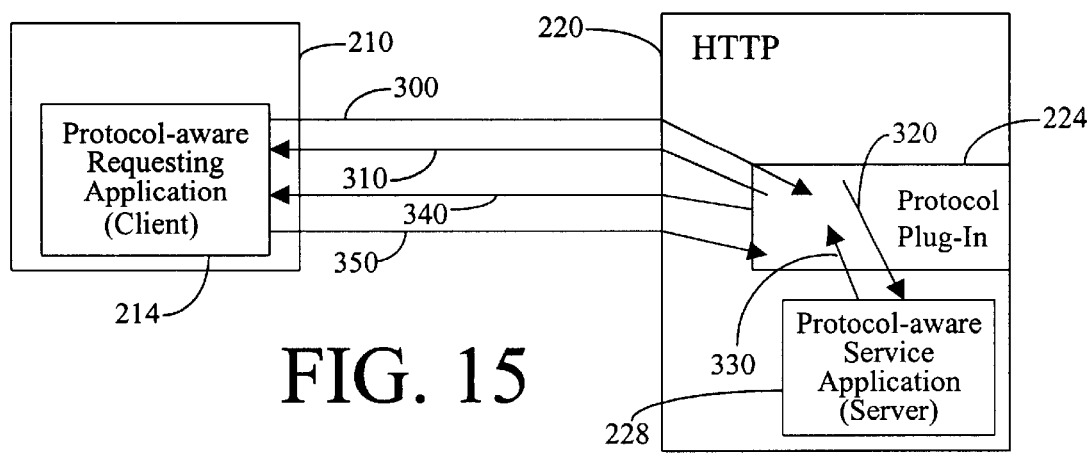
FIG. 15 is a block diagram schematically illustrating message flow for completion of a Request from a client requesting application to an HTTP browser-based service application according to an illustrated implementation of the present invention.
Figure 16:
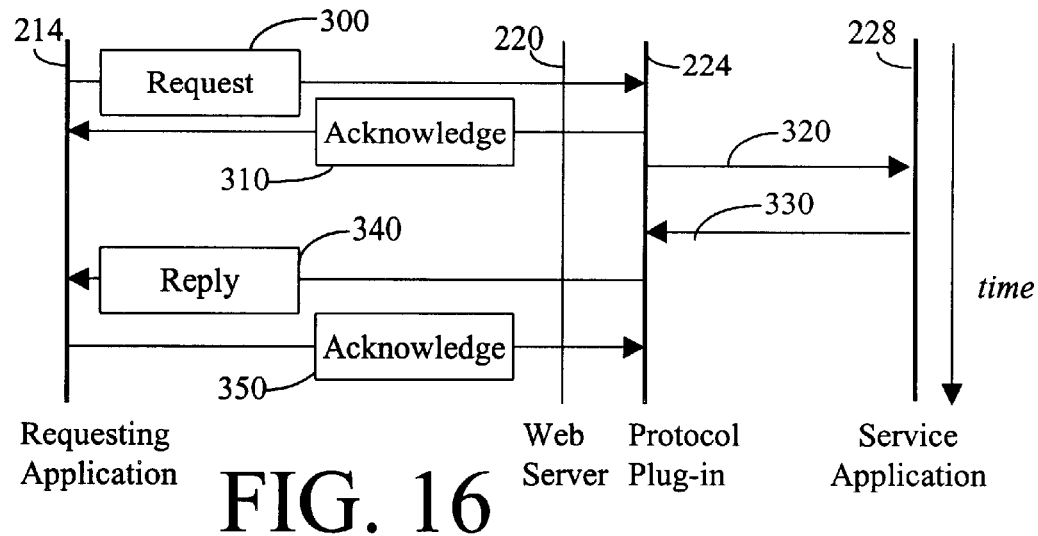
FIG. 16 is a block diagram schematically illustrating the sequence of the message interaction flow between the applications of FIG. 15, according to an embodiment of the present invention.
Figure 17:
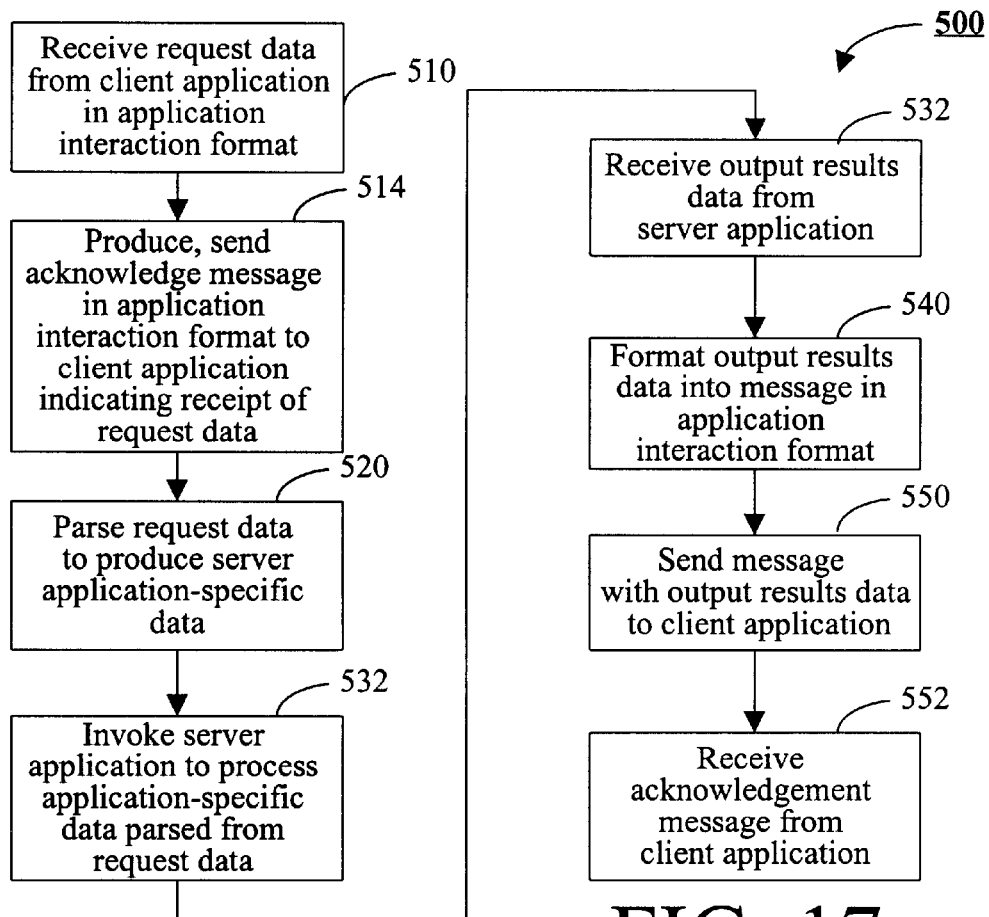
FIG. 17 is a flowchart illustrating the message processing steps for the message interaction sequence of FIG. 16.

Application interaction flow and sequencing is illustrated in FIG. 15 and FIG. 16, and in the flowchart of FIG. 17, with an example of the interactions between a requesting client application 214 resident on machine 210 and service application 228 resident on Web server 220. Service application 228 is an application hosted by Web server 220 that accepts HTML (or perhaps XML) documents using Web client-server protocol HTTP. Web server 220 includes a plug-in application 224 specifically defined to receive and handle messages in the application interaction protocol format of the present invention. In FIG. 15, CX server 10 is not shown but functions as described in the discussion accompanying FIG. 1, controlling the transaction logic and services execution between applications 214 and 228.

With continued reference to FIG. 15, suppose, for purposes of illustration, application 214 provides items for sale or selection by a user and application 228 is a catalog service hosted at a Web site identified by a particular URL. Catalog service 228 provides services such as updates about available items to application 214 upon receiving a service request from application 214. The example assumes that catalog service 228 behaves according to industry-accepted standards. A transaction originating with client application 214 requesting a catalog update is received by CX server 10. CX server 10 produces an instance of the catalog update transaction with its service list and conditional logic, and generates the messages necessary to execute the transaction. Messages 300, 310, 340 and 350 are exchanged between requesting client application 214 and catalog service application 228, and messages 320 and 330 are exchanged between protocol plug-in 224 and catalog service application 228. FIG. 16 shows the exchange order and types of the messages between applications 224 and 228, and FIG. 17 is a flowchart of the message handling operation 500 performed by protocol plug-in 224. Request message 300 originates the catalog update transaction, and is received in box 510. Protocol plug-in 228 sends acknowledge message 310, in box 514, immediately in response to receipt of request message 300. Protocol plug-in 224 parses the request message, in box 514, to produce application-specific data for catalog service application 228, and then invokes catalog service application 228, in box 532, providing the necessary input data via message 320. Protocol plug-in 224 then receives output catalog update data, in box 532, from catalog service application 228 via message 320. Then, after formatting the output data into the correct protocol message format in box 540, protocol plug-in 224 sends reply message 340, in box 550, to requesting application 214; reply message 340 carries the catalog update information. Requesting application 214 then sends acknowledge message 350 immediately in response to receipt of reply message 340, and protocol plug-in 224 receives acknowledge message 350 in box 552.

4. The Machine and Software Product of the Invention

Figure 20:
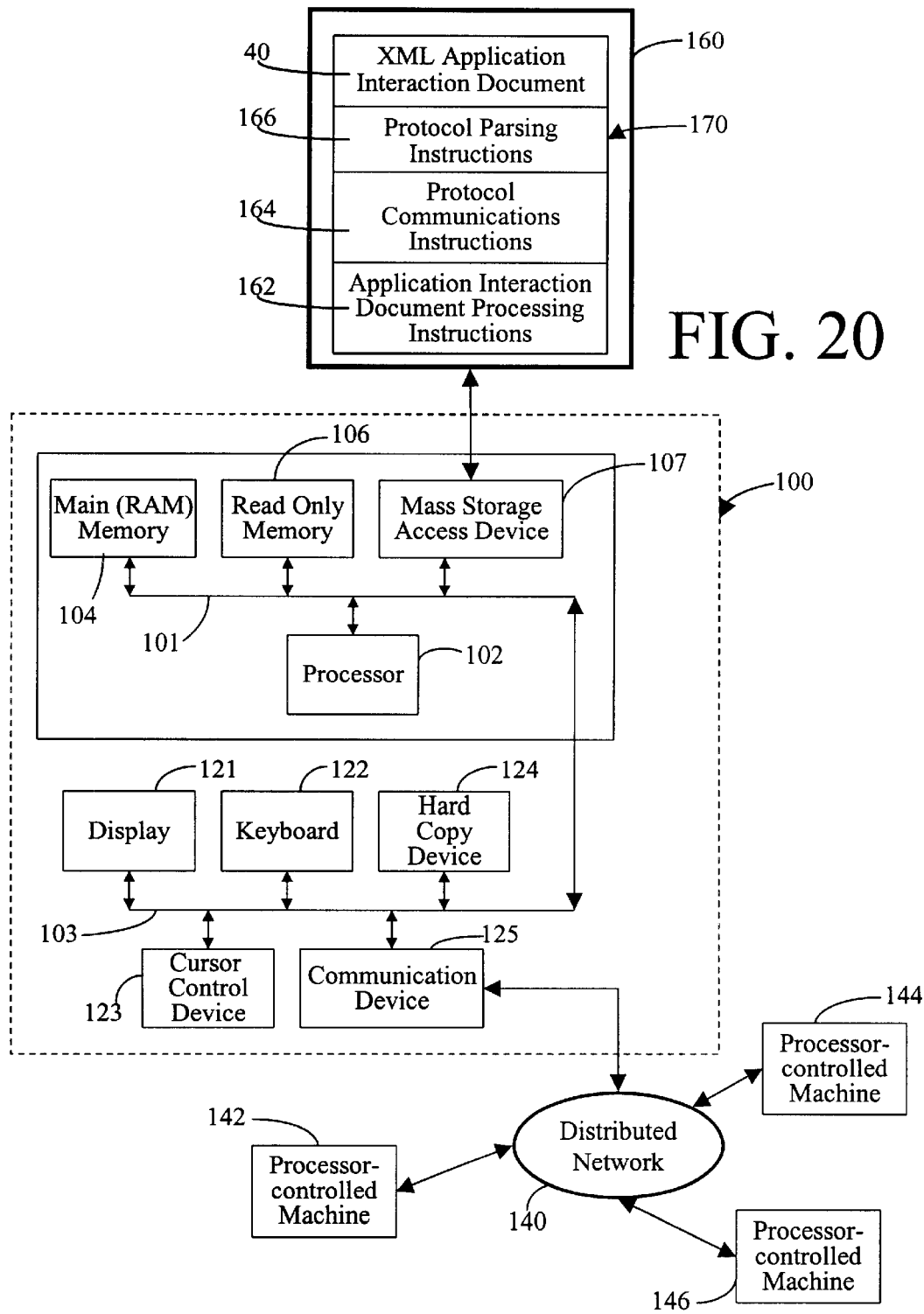
FIG. 20 is a simplified block diagram illustrating a distributed computer network including several processor-controlled machines, showing the components of one suitably configured processor-controlled machine in which the present invention may be used, and further illustrating the software product of the present invention and its use in conjunction with a machine in the network.

FIG. 20 is a block diagram of distributed network 140 that includes processor-controlled machines 142, 144, 146 and 100. The component parts of machine 100 have been enlarged to schematically illustrate a machine in which the present invention may be used. Machine 100 is an example of a processor-controlled machine that may be used to implement commerce exchange server 10 of FIG. 1 and the application interaction protocol of the present invention. Similarly, any one of the processor-controlled machines 142, 144 and 146 may implement one of machines 20, 22 or 24 that include a protocol-aware service application or one of machines 32 or 36 that include a protocol-aware client application of the commerce network illustrated in FIG. 1. While the present invention may be used in any machine having the common components, characteristics, and configuration of machine 100, the invention is not inherently related to any particular processor, machine, system or other apparatus. The machine or system may be specially constructed and optimized for the purpose of carrying out the invention. Alternatively, machine 100 may comprise a general-purpose computer selectively activated or reconfigured by a computer program stored in the computer. In still another alternative machine 100 may be a combination of a general-purpose computer and auxiliary special purpose hardware. When a machine such as machine 100 is suitably programmed to embody the present invention, the machine is not a standard or known configuration. In the claims, machine 100 is referred to as a "computer" for purposes of simplifying the claim language, but the term "computer" is intended to include any and all machines as described and shown in FIG. 20 and is not intended to limit the scope of machine 100 in any way.

Machine 100 includes a bus or other internal communication means 101 for communicating information, and a processor 102 coupled to the bus 101 for processing information. Machine 100 further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. Machine 100 also comprises a read only memory (ROM) and/or static storage device 106 coupled to bus 101 for storing static information and instructions for processor 102, and a data mass storage access device 107 such as a magnetic disk drive or optical disk drive. Data mass storage access device 107 is coupled to bus 101 and is typically used with a computer readable mass storage medium 160, such as a magnetic or optical disk, for storage of information and instructions. Machine 100 may include more than one storage access device 107. For example, machine 100 may include both a storage access device for a non-removable medium such as an internal magnetic (hard) disk and a mass storage access device for a removable medium such as an optical CD-ROM, a magnetic floppy disk, a PC-card, or magnetic tape.

Machine 100 may, but need not, include a conventional display device 121 capable of presenting images, such as a cathode ray tube or a liquid crystal display (LCD) device or any other device suitable for presenting images. Display device 121 is coupled to bus 101 through bus 103 for displaying information to a computer user. An alphanumeric input device 122, including alphanumeric and other keys, may also be coupled to bus 101 through bus 103 for communicating information and command selections to processor 102. An additional user input device is cursor control device 123, such as a mouse, a trackball, stylus, electronic tablet, or cursor direction keys coupled to bus 101 through bus 103 for communicating direction information and command selections to processor 102, and for controlling cursor movement on display device 121. Another device which may optionally be coupled to bus 101 through bus 103 is a hard copy device 124 which may be used for printing instructions, data, or other information on a medium such as paper, film, or similar types of media. Note that the actual manner in which the physical components of machine 100 are connected may vary from that shown in FIG. 20. The manner of connection may include hardwired physical connections between some or all of the components, as well as connections over wired or wireless communications facilities, such as through remote or local communications networks and infrared and radio connections. Note further that not all of the components of machine 100 shown in FIG. 20 may be required to carry out the present invention. Those of ordinary skill in the art will appreciate that various configurations of machine 100 may be used to carry out a particular implementation of the application interaction protocol system of the present invention. For example, machine 100 may be a Workgroup Enterprise server machine manufactured by Sun Microsystems, Inc. of Mountain View Calif. that includes one or more Ultra SPARC™ processors, and that operates using the Solaris™ operating system.

Machine 100 further includes communication, or network interface, device 125, coupled to bus 101 through bus 103, for use in sending data to and receiving data from other nodes of distributed network system 140 according to standard network protocols. This communication device 125 may include any of a number of commercially available networking peripheral devices such as those used for coupling to an Ethernet, token ring, Internet, or wide area network.

Processor 102, together with an operating system, operates to execute instructions (e.g., program code) to produce and use data. The program code and data may reside in main memory (RAM) 104, in read only memory 106, on the non-removable hard disk storage accessed by storage access device 107, or even on another processor-controlled machine connected to network 140. The program code and data may also reside on a removable medium that is loaded or installed onto machine 100 when needed by means of a storage access device 107 suitable for that purpose. When program code (i.e., software) implementing the present invention is stored in a memory device accessible to processor 102, machine 100 is configured to perform the functions of commerce exchange server 10 of FIG. 1, and, in particular, to produce and process the application protocol messages having the structured format illustrated in FIG. 4 and FIG. 5. An input application interaction message, such as Request message 300 of FIG. 16, is provided from communication device 125 and is forwarded via data bus 103 to bus 101 for storage in main memory 104 for later access by processor 102. Processor 102 executes program instructions, included in one of the above-described memory components, that implement operation 500 of FIG. 17. During execution of the instructions, processor 102 accesses memory 104 or 106 to obtain or store data necessary for performing its operations. For example, when machine 100 is configured to perform operation 500 of FIG. 17, processor 102 may access CXIP message content DTD 60 (FIG. 5) in memory 104 in order to perform process 520 of parsing the application interaction message.

FIG. 20 also shows software product 160, an article of manufacture that can be used in a machine that includes components like those shown in machine 100. Software product 160 includes data storage medium 170 which stores instructions, also referred to as program code or computer readable code, for executing operations that produce and parse the protocol messages of the present invention, such as operation 400 of FIGS. 13 and 14. As used herein, a "data storage medium" covers one or more distinct units of a medium that together store a body of data. Examples of data storage media include magnetic media such as floppy disks, diskettes, magnetic tape, and PC cards (also previously known as PCMCIA memory cards), optical media such as CD-ROMs, and semiconductor media such as semiconductor ROMs and RAMs. By way of example, a set of magnetic disks or optical CD-ROMs storing a single body of data would be a data storage medium.

Software product 160 may be commercially available to a purchaser or user in several forms. In one typical form, software product 160 is commercially available in the form of a shrink-wrap package that includes data storage medium 170 and appropriate documentation describing the product. In that case, data storage medium 170, also referred to as a computer-readable medium, is a physical medium that stores instruction data that is accessed by storage medium access device 107 or its equivalent. "Storage medium access device" is a device that can access data on a data storage medium. Storage medium access device 107 may be contained in a distinct physical device into which data storage medium 170 is inserted into, mounted on, or otherwise installed into, in order for the storage medium access device to access and retrieve the data stored thereon. Examples of storage medium access devices include disk drives, CD-ROM readers, and DVD devices. A storage medium access device may be physically separate from machine 100, or enclosed as part of a housing of machine 100 that includes other components. Mass storage device 107 may also be remotely located (not shown) as part of some other processor-controlled machine, such as a server, on network 140. Mass storage device 107 provides instructions retrieved from medium 170 to processor 102 via bus 101, causing processor 102, when executing the instructions, to produce protocol messages in accordance with the teachings herein. If device 107 is remotely located, program instructions are provided from storage medium 170 to processor 102 of machine 100 by way of communication device 125 from network 140.

Software product 160 may also be commercially or otherwise available to a user in the form of a data stream indicating instruction data for processing and producing the application interaction messages of the present invention that is transmitted to the user over a communications facility from a remotely-located storage device. In this case, article 160 is embodied in physical form as signals stored on the remotely-located storage device; the user accesses the contents of data storage medium 170 in order to purchase or otherwise obtain a copy of those contents, but typically does not purchase or acquire any rights in the actual remotely-located storage device. When software product 160 is provided in the form of a data stream transmitted to the user over a communications facility from the remotely-located storage device, instruction data stored on data storage medium 170 is accessible via communications device 125. Alternatively, a data stream transmitted to the user over a communications facility from the remotely-located storage device may be stored in some suitable local memory device of machine 100 or a data storage medium 107 locally accessible to processor 102 using bus 101.

FIG. 20 shows data storage medium 170 configured with instruction data for performing operation 400 (FIGS. 13 and 14). The stored data includes application interaction processing instructions 162, application interaction message communications instructions 164, application interaction message parsing instructions 166 and XML application interaction document 40. The instruction data is provided to processor 102 for execution when application interaction processing is to be performed. For example, when instructions 162 are provided to processor 102, and processor 102 executes them, machine 100 is operated to perform the operations for determining the message type, acknowledging the message and then processing the message according to its message type, according to the operation 400 of FIGS. 13 and 14. Operation 400 may cause processor 102 to access the message DTD of FIGS. 3, 4 and 5 associated with XML application interaction document 40 in order to parse the message and obtain relevant data needed for further transaction processing. Note also that when software product 160 comprises the entire commerce exchange server application 10 of FIG. 1, data storage medium 170 may include additional instruction data (not shown) for carrying out services 12, 14, 16 and 19 of CX server 10.

Appendix of Terminology

A protocol is a formal set of specifications and conventions governing the format and control of interaction, including information exchange, among communicating functional units in a network. Protocols may govern portions of a network, types of service, or administrative procedures. For example, a data link protocol is the specification of methods whereby data communications over a data link are performed in terms of particular transmission mode, control procedures, and recovery procedures. In a layered communications system architecture, a protocol also refers to the formal set of procedures that are adopted to facilitate functional interoperation within the layered hierarchy.

The Internet is a collection of interconnected individual networks operated by government, industry, academia, and private parties that use a set of standard data communications protocols to form a global, distributed network. TCP/IP and HTTP, defined below, are examples of standard protocols used to transmit information between networks or machines included in the Internet and between individual processor-controlled machines connected to a network.

Transmission Control Protocol/Internet Protocol, or TCP/IP is a set of standard Internet protocols that completely specify data communication and exchange between two computers connected to the Internet. TCP/IP specifications include defining the formation of data packets, packet addressing, handshaking and error correction. The set of TCP/IP protocols includes, but is not limited to, protocols such as TCP, IP, UDP, ICMP, FTP, and SMTP. Additional application and management protocols are sometimes considered part of the TCP/IP Suite. This includes protocols such as SNMP.

The World Wide Web ("Web") refers to a distributed collection of hypertext documents, also referred to as "Web documents" or "Web pages", that are accessible from a processor-controlled machine connected to the Internet using one or more standard Internet protocols. Web document may be viewed by a user or used by an application program. HTTP (defined below) is an example of a standard protocol for locating and acquiring Web documents. HTML (HyperText Markup Language) is an example of a language used to create Web documents.

The term client-server refers to a model of interaction in a distributed system in which a program at one site sends a request to a program at another site and waits for or obtains a response. The requesting program is called the "client," and the program that responds to the request is called the "server." One type of client is a "Web browser" (or simply "browser") which runs on a computer of a user; the program which responds to browser requests by serving Web pages is commonly referred to as a "Web server."

The Hypertext Transport Protocol, or HTTP, is, in the context of the World Wide Web, a client-server protocol that facilitates the transfer of hypertext-based files between local and remote systems. HTTP includes a number of different types of messages that may be sent from a client to a server to request different types of server actions. For example, HTTP governs the exchange of a client request for a HTML document from a Web browser and its receipt from a Web server.

MIME (Multipurpose Internet Multimedia Extensions) Type refers to a file extension or attachment that specifies the type or format of the file (e.g., HTML, text, graphics, audio, etc.). MIME typing allows a Web browser to determine how to process a file that is received from a Web server. Standard Web browsers come pre-configured with software interfaces known as plug-ins to handle popular MIME types, and can be configured by the user to handle new MIME types.

Extensible Markup Language, abbreviated XML, describes a class of data objects called XML documents and partially describes the behavior of computer programs which process them. XML is an application profile or restricted form of SGML, the Standard Generalized Markup Language [ISO 8879]. By construction, XML documents are conforming SGML documents. Each XML document has both a logical and a physical structure. Physically, the document is composed of units called entities. An entity may refer to other entities to cause their inclusion in the document. A document begins in a "root" or document entity. Logically, the document is composed of declarations, elements, comments, character references, and processing instructions, all of which are indicated in the document by explicit markup. The logical and physical structures must nest properly, as described in "4.3.2 Well-Formed Parsed Entities" in the World Wide Web Consortium XML specification. A software module called an XML processor is used to read XML documents and provide access to their content and structure. It is assumed that an XML processor is doing its work on behalf of another processing entity or module. An XML document is valid if it has an associated document type declaration (DTD) and if the document complies with the constraints expressed in its associated DTD. An XML document is a well-formed XML document if the document, taken as a whole, matches the XML production labeled "document," meets all the constraints with respect to being well-formed given in the XML specification, and each of the parsed entities referenced directly or indirectly within the document is well-formed. A well-formed XML document may also be valid if it meets additional criteria, as specified in World Wide Web Consortium, *Extensible Markup Language (XML) 1.0: W3C Recommendation* 10-Feb.-1998.) Additional information about XML is available at http://www.w3.org/XML and www.w3.org/TR/PR-xml-971208.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

What is claimed is:

1. A system for managing application-to-application communication among a plurality of applications resident on a plurality of computers in a distributed computer network, the system comprising:

at least one requesting application resident on one of the plurality of computers in the distributed computer network, the requesting application being capable of producing a transaction request indicating a transaction;

at least one service application resident on one of the plurality of computers in the distributed computer network, the service application being capable of performing the transaction and producing a transaction response;

a plurality of structured documents that each indicate a communication to one of the requesting application and the service application, wherein each structured document includes a message type that is associated with a particular predetermined sequence of structured documents of a plurality of predetermined sequences of structured documents, wherein the particular predetermined sequence of structured documents are to be exchanged between the requesting application and the service application, and wherein the plurality of predetermined sequences of structured documents collectively defines an application interaction protocol; and a process automation application resident on one of the plurality of computers in the distributed computer network, the process automation application determining the message type and producing and sending the predetermined sequence of structured documents to cause the transaction to be performed by the service application and the transaction response to be sent to the requesting application.

2. The system of claim 1 for managing application-to-application communication among a plurality of applications resident on a plurality of computers in a distributed computer network wherein:

the message type is a particular message type of a plurality of message types;

the plurality of message types includes an acknowledgment message type defining an acknowledgement structured document indicating receipt of a first structured document previously sent by the process automation application;

the requesting application and the service application produce the acknowledgement structured document in response to receipt of a second structured document that has any message type except an acknowledge message type; and the process automation application monitors delivery of structured documents to requesting applications and service applications using the acknowledgement structured document.

3. The system of claim 1 for managing application-to-application communication among a plurality of applications resident on a plurality of computers in a distributed computer network wherein the process automation application provides for control of asynchronous interactions between the requesting application and the service application.

4. The system of claim 1 for managing application-to-application communication among a plurality of applications resident on a plurality of computers in a distributed computer network wherein the structured document uses Extensible Markup Language (XML) tags indicating control data and input-output data, the control data tag indicating the message type of the transaction message and a service type, the input-output data tag indicating input data required by the service type and output data produced by the service type.

5. The system of claim 1 for managing application-to-application communication among a plurality of applications resident on a plurality of computers in a distributed computer network wherein the process automation application sends the structured documents between the requesting application and the service application using the TCP/IP data communications protocol.

6. The system of claim 1 for application-to-application communication processing among a plurality of applications resident on a plurality of computers in a distributed computer network wherein the process automation application includes a protocol bridging operation for converting structured documents received from the requesting application using the TCP/IP data communications protocol to structured documents using the SMTP data communications protocol for transmission to the service application.

7. The system of claim 1 for application-to-application communication processing among a plurality of applications resident on a plurality of computers in a distributed computer network wherein the process automation application is a plug-in application associated with a Web browser in communication with the service application, and wherein the process automation application sends structured documents between the requesting application and the service application using the HTTP protocol.

8. The system of claim 1 for managing application-to-application communication among a plurality of applications resident on a plurality of computers in a distributed computer network wherein:

the message type is a particular message type of a plurality of message types; and each of the plurality of message types indicates an expected action by an application that is independent of a functional domain of the transaction request.

9. The system of claim 1 for managing application-to-application communication among a plurality of applications resident on a plurality of computers in a distributed computer network wherein:

the message type is a particular message type of at least three message types;

each of the at least three message types is associated with one of a plurality of application-to-application interactions; and the plurality of application-to-application interactions includes at least a request-reply application-to-application interaction, a publish-subscribe application-to-application interaction, and a broadcast-multicast application-to-application interaction.

10. In a distributed computer network, a method for managing application-to-application communication among a plurality of requesting applications and a plurality of service applications programs, the method comprising the steps of:

receiving transaction request data indicating a transaction from a requesting application;

determining a message type using the transaction request data, the message type being one of a plurality of message types, wherein the message type is associated with a particular predetermined sequence of structured documents of a plurality of predetermined sequences of structured documents, wherein the particular predetermined sequence of structured documents are to be exchanged between the requesting application and the service application, and wherein the plurality of predetermined sequences of structured documents collectively defines an application interaction protocol; and producing, sending and receiving the particular predetermined sequence of structured documents, thereby causing the transaction to be performed by the service application and a transaction response to be sent to the requesting application.

11. The method of claim 10 for managing application-to-application communication among a plurality of requesting applications and a plurality of service applications wherein one of the structured documents in the particular predetermined sequence of structured documents is sent to the requesting application and has a particular message type of the plurality of message types indicating an acknowledgement of receipt of the transaction request data.

12. The method of claim 10 for managing application-to-application communication among a plurality of requesting applications and a plurality of service applications wherein the plurality of message types include Request, Reply, Publish, Notify, Subscribe and Unsubscribe.

13. The method of claim 10 for managing application-to-application communication among a plurality of requesting applications and a plurality of service applications wherein each structured document of the particular predetermined sequence of the structured documents uses Extensible Markup Language (XML) tags and has a document type definition (DTD) associated therewith.

14. The method of claim 10 for managing application-to-application communication among a plurality of requesting applications and a plurality of service applications wherein:

when the particular predetermined sequence of structured documents is produced according to a broadcast-multicast application-to-application interaction of the application interaction protocol, at least one of the structured documents is a Notify structured document having a message type of Notify and indicating transaction data to be sent to a subscriber list of service applications; and the method further includes the step of selecting all service applications on the subscriber list from among the plurality of service applications, and sending the Notify structured document to the subscriber list of service applications to process the transaction data.

15. The method of claim 10 for managing application-to-application communication among a plurality of requesting applications and a plurality of service applications wherein:

when the particular predetermined sequence of structured documents is produced according to a publish-subscribe application-to-application interaction of the application interaction protocol, at least one of the structured documents is a Subscribe structured document having a message type of Subscribe and indicating transaction request data including a request to add the requesting application to a subscriber list of service applications; and the method further includes the step of selecting at least one target service application from among the plurality of service applications, and sending the Subscribe structured document to the target service application to process the transaction request data.

16. The method of claim 10 for managing application-to-application communication among a plurality of requesting applications and a plurality of service applications wherein:

the message type is a particular message type of at least three message types;

each of the at least three message types is associated with one of a plurality of application-to-application interactions; and the plurality of application-to-application interactions includes at least a request-reply application-to-application interaction, a publish-subscribe application-to-application interaction, and a broadcast-multicast application-to-application interaction.

17. A method for operating a first computer to manage application-to-application communication between a first application resident on the first computer and a second application resident on a second computer, the first and second computers being included in a distributed network, the method comprising the steps of:

receiving from the second application a request structured document having a request message type and indicating input application interaction data;

producing and sending to the second application a first acknowledge structured document, the first acknowledge structured document having an acknowledge message type and indicating an acknowledgement of receipt of the input application interaction data from the second application;

parsing the request structured document to produce first application-specific data;

invoking the first application to process the first application-specific data;

receiving output application-specific data indicating output results data from the first application processing the first application-specific data;

producing a reply structured document having a reply message type and including the output application-specific data;

sending the reply structured document to the second application resident on the second computer;

receiving from the second application a second acknowledge structured document having an acknowledge message type and indicating an acknowledgement of receipt of the output application interaction data from the first application;

wherein the steps above define a particular predetermined sequence of structured documents that are exchanged between the first application and the second application; and wherein the particular predetermined sequence of structured documents is included in a plurality of predetermined sequences of structure documents that collectively defines an application interaction protocol.

18. The method of claim 17 for operating a first computer to manage application-to-application communication between a first application and a second application wherein each structured document of the request structured document, the reply structured document, the first acknowledge structured document, and the second acknowledge structured document uses Extensible Markup Language (XML) tags.

19. The method of claim 17 for operating a first computer to manage application-to-application communication between a first application and a second application wherein the first application is in communication with a Web browser application that has a plug-in application associated therewith for receiving and sending structured documents between the first application and the second application using the Hypertext Transport Protocol (HTTP) such that each structured document of the request structured document, the reply structured document, the first acknowledge structured document, and the second acknowledge structured document is transmitted using the HTTP protocol.

20. An article of manufacture comprising a data storage medium having computer readable instruction data embodied therein, the computer readable instruction data indicating instructions executed by a processor in a processor-controlled machine for managing application-to-application communication among a plurality of requesting applications and a plurality of service applications resident on a plurality of processor-controlled machines in a distributed network, the computer readable instructions in the article of manufacture comprising:

a first portion of instructions which when executed causes the processor to receive transaction request data indicating a transaction from a requesting application of the plurality of requesting applications;

a second portion of instructions which when executed causes the processor to determine a message type using the transaction request data, the message type being one of a plurality of message types, wherein the message type is associated with a particular predetermined sequence of structured documents of a plurality of predetermined sequences of structured documents, wherein the particular predetermined sequence of structured documents are to be exchanged between the requesting application and the service application, and wherein the plurality of predetermined sequences of structured documents collectively defines an application interaction protocol; and a third portion of instructions which when executed causes the processor to produce, send and receive the particular predetermined sequence of structured documents, thereby causing the transaction to be performed by a service application of the plurality of service applications and a transaction response to be sent to the requesting application.

21. The article of manufacture of claim 20 wherein:

the message type is a particular message type of at least three message types;

each of the at least three message types is associated with one of a plurality of application-to-application interactions; and the plurality of application-to-application interactions includes at least a request-reply application-toapplication interaction, a publish-subscribe application-to-application interaction, and a broadcast-multicast application-to-application interaction.

22. An XML application interaction message document stored on a computer-readable medium comprising:
   a message header data portion indicating message-content size data; and
   a message content data portion indicating a message type having one of a plurality of message types;
   the message content data portion further indicating transaction request data;
   the transaction request data, when parsed by a process automation application, causing the process automation application to produce a particular ordered sequence of XML application interaction message documents of a plurality of ordered sequences of structured documents that collectively defines an application interaction protocol, the process automation application controlling exchange of the particular ordered sequence of XML application interaction message documents between a requesting application and a service application.

23. The XML application interaction message document of claim 22 wherein the message content data portion further includes:
   a service type specifying a service to be performed by the service application; and
   an input-output data portion indicating input data required by the service application and output data produced by the service application.

24. The XML application interaction message document stored on a computer-readable medium of claim 22 wherein:
   the plurality of message types includes at least three message types;
   each of the at least three message types is associated with one of a plurality of application-to-application interactions; and
   the plurality of application-to-application interactions includes at least a request-reply application-to-application interaction, a publish-subscribe application-to-application interaction, and a broadcast-multicast application-to-application interaction.

* * * * *

UNITED STATES PATENT AND TRADEMARK OFFICE
CERTIFICATE OF CORRECTION

PATENT NO. : 6,772,216 B1
DATED : August 3, 2004
INVENTOR(S) : Ankireddipally et al.

It is certified that error appears in the above-identified patent and that said Letters Patent is hereby corrected as shown below:

<u>Title page,</u>
Item [*] Notice, please delete the following:
"This patent issued on a continued prosecution application filed under 37 CFR 1.53(d), and is subject to the twenty year patent term provisions of 35 U.S.C. 154(a)(2).

This patent is subject to a terminal disclaimer."

Signed and Sealed this

Fourteenth Day of December, 2004

JON W. DUDAS
*Director of the United States Patent and Trademark Office*